ns502B2

United States Patent
Shin

(10) Patent No.: US 9,608,502 B2
(45) Date of Patent: Mar. 28, 2017

(54) IMPACTIVE VIBRATION GENERATING APPARATUS AND APPLICATION APPARATUS USING SAME

(71) Applicant: Seong-Ho Shin, Yongin-si (KR)

(72) Inventor: Seong-Ho Shin, Yongin-si (KR)

(73) Assignee: Seong-Ho Shin, Gyeonggi-do (KR)

( * ) Notice: Subject to any disclaimer, the term of this patent is extended or adjusted under 35 U.S.C. 154(b) by 0 days.

(21) Appl. No.: 14/348,875

(22) PCT Filed: May 27, 2013

(86) PCT No.: PCT/KR2013/004601
§ 371 (c)(1),
(2) Date: Mar. 31, 2014

(87) PCT Pub. No.: WO2013/180430
PCT Pub. Date: Dec. 5, 2013

(65) Prior Publication Data
US 2015/0236576 A1   Aug. 20, 2015

(30) Foreign Application Priority Data

May 29, 2012   (KR) .................. 10-2012-0057030
Jan. 7, 2013   (KR) .................. 10-2013-0001400

(51) Int. Cl.
*A63F 13/10*   (2006.01)
*H02K 33/02*   (2006.01)
(Continued)

(52) U.S. Cl.
CPC ........... *H02K 33/02* (2013.01); *A63F 13/285* (2014.09); *G08B 6/00* (2013.01); *H02K 7/06* (2013.01); *H02K 13/006* (2013.01); *H02K 33/16* (2013.01)

(58) Field of Classification Search
None
See application file for complete search history.

(56) References Cited

U.S. PATENT DOCUMENTS 3,761,851 A * 9/1973 Nelson .................. H02K 33/00
                                                              310/41
3,970,980 A * 7/1976 Nelson .................. H02K 33/16
                                                              310/39
(Continued)

FOREIGN PATENT DOCUMENTS

JP   2001-275331 A   10/2001
JP   2002-110420 A   4/2002
(Continued)

OTHER PUBLICATIONS

Yang, T-H et al. (Jun. 21, 2011). "A New Subminiature Impact Actuator for Mobile Devices," presented at IEEE World Haptics Conference, Istanbul, Turkey, p. 95-100.
(Continued)

*Primary Examiner* — Omkar Deodhar
(74) *Attorney, Agent, or Firm* — I P & T Group LLP

(57) ABSTRACT

An impactive vibration generating apparatus includes a rotary unit having a shaft and a coil arranged around the shaft; a fixing unit surrounding the rotary unit and having a magnet therein; a commutator arranged along the circumference of the shaft connected to the coil; a pair of brushes to slidably contacting the commutator; a protrusion attached to one part of the rotary unit; and a stopper contacting the protrusion when the rotary unit rotates so as to interrupt the rotation of the rotary unit. According to the impactive vibration generating apparatus, a sharp and strong single impactive vibration or only a few impactive vibrations can be generated. Further, a strong vibration can be caused by continuous impactive vibrations, and the frequency or cycle of the generation of the impactive vibrations can be adjusted.

12 Claims, 15 Drawing Sheets

(51) Int. Cl.
    *A63F 13/285*    (2014.01)
    *G08B 6/00*      (2006.01)
    *H02K 7/06*      (2006.01)
    *H02K 13/00*     (2006.01)
    *H02K 33/16*     (2006.01)

(56) References Cited

U.S. PATENT DOCUMENTS

| | | | | |
|---|---|---|---|---|
| 4,117,363 | A | * | 9/1978 | Honda .................. H02K 23/58 310/219 |
| 4,287,457 | A | * | 9/1981 | Takemura .............. H02K 33/16 310/36 |
| 4,950,931 | A | * | 8/1990 | Goldenberg et al. .. H02K 33/16 310/15 |
| 5,554,971 | A | * | 9/1996 | Foster ..................... G08B 6/00 340/407.1 |
| 5,936,516 | A | * | 8/1999 | Narea ................... B06B 1/0246 340/407.1 |
| 6,001,014 | A | | 12/1999 | Ogata et al. |
| 6,268,671 | B1 | | 7/2001 | Furuki |
| 6,593,675 | B2 | | 7/2003 | Lee |
| 6,697,043 | B1 | * | 2/2004 | Shahoian ................ A63F 13/06 345/156 |
| 8,004,124 | B2 | | 8/2011 | Kwon et al. |
| 8,242,641 | B2 | | 8/2012 | Bae et al. |
| 8,446,055 | B2 | | 5/2013 | Jun et al. |
| 2001/0051541 | A1 | * | 12/2001 | Matsuura et al. ....... A63F 13/10 463/31 |
| 2012/0080959 | A1 | | 4/2012 | Oh et al. |

FOREIGN PATENT DOCUMENTS

| | | |
|---|---|---|
| JP | 2002-191866 A | 7/2002 |
| JP | 3560450 B2 | 9/2004 |
| KR | 10-1998-0032560 A | 7/1998 |
| KR | 10-0389631 B | 6/2003 |
| KR | 10-2005-0086150 A | 8/2005 |
| KR | 10-2005-0122101 A | 12/2005 |
| KR | 10-0563391 B | 3/2006 |
| KR | 10-0576525 B | 7/2007 |
| KR | 10-2008-0084155 A | 9/2008 |
| KR | 10-2010-0044381 A | 4/2010 |
| KR | 10-2010-0120735 A | 11/2010 |
| KR | 10-2011-0008534 A | 1/2011 |
| KR | 10-1046044 B | 7/2011 |
| KR | 10-2011-0101655 A | 9/2011 |
| KR | 10-1063880 B1 | 9/2011 |
| KR | 10-1079448 B | 11/2011 |
| KR | 10-1084715 B | 11/2011 |
| KR | 10-2012-0006729 A | 1/2012 |

OTHER PUBLICATIONS

English Abstract of KR 10-0389631 by Korean Intellectual Property Office, Korean Patent Abstracts, 2 pages.
English Abstract of KR 10-2005-0086150 by Korean Intellectual Property Office, Korean Patent Abstracts, 1 page.
English Abstract of KR 10-005-0122101 by Korean Intellectual Property Office, Korean Patent Abstracts, 1 page.
English Abstract of KR 10-1084715 by Korean Intellectual Property Office, Korean Patent Abstracts, 1 page.
English Abstract of KR 10-0563391 by Korean Intellectual Property Office, Korean Patent Abstracts, 1 page.
English Abstract of KR 10-0576525 by Korean Intellectual Property Office, Korean Patent Abstracts, 1 page.
English Abstract of KR 10-2011-0101655 by Korean Intellectual Property Office, Korean Patent Abstracts, 2 pages.
English Abstract of KR 10-2010-0120735 by Korean Intellectual Property Office, Korean Patent Abstracts, 1 page.
English Abstract of KR 10-2011-0008534 by Korean Intellectual Property Office, Korean Patent Abstracts, 1 page.
English Abstract of KR 10-1079448 by Korean Intellectual Property Office, Korean Patent Abstracts, 1 page.
English Abstract KR 10-2010-0044381 by Korean Intellectual Property Office, Korean Patent Abstracts, 1 page.
English Abstract of KR 10-1046044 by Korean Intellectual Property Office, Korean Patent Abstracts, 1 page.
English Abstract of KR 10-2008-0084155 by Korean Intellectual Property Office, Korean Patent Abstracts, 1 page.
English Abstract of KR 10-2012-0006729 by Korean Intellectual Property Office, Korean Patent Abstracts, 1 page.
Machine translation of Abstract in English of JP 2001-275331 visited at www.espacenet.com on Apr. 15, 2015, 2 pages.
Machine translation of Abstract in English of JP 2002-110420 visited at www.espacenet.com on Apr. 15, 2015, 2 pages.
English Abstract of KR 10-1063880 by Korean Intellectual Property Office, Korean Patent Abstracts, 1 page.
International Preliminary Report on Patentability mailed on Dec. 11, 2014 for International Application No. PCT/KR2013/004601 filed on May 27, 2013, 14 pages.
International Search Report mailed on Sep. 24, 2013 for International Application No. PCT/KR2013/004601 filed on May 27, 2013, 2 pages.

\* cited by examiner

IMPACTIVE VIBRATION GENERATING APPARATUS AND APPLICATION APPARATUS USING SAME

CROSS-REFERENCE TO RELATED APPLICATIONS

This application is the National Stage of International Patent Application No. PCT/KR2013/004601, filed May 27, 2013, which claims the benefit of South Korean Patent Application No. 10-2012-0057030, filed May 29, 2012, and South Korean Patent Application No. 10-2013-0001400, filed Jan. 7, 2013, all of which are incorporated herein by reference.

BACKGROUND

Technical Field

The present invention relates to an impactive vibration generating apparatus, and more particularly, to an impactive vibration generating apparatus which can be used as an interface means for the transmission of several signals and communications between various devices such as a multimedia device, game device and a communication device, etc. and a user by freely generating an impactive vibration.

Background Art

Generally, a vibration generating apparatus is embedded into an electronic device such as a mobile phone, and it serves a function to inform a user of the reception of a call or an arrival of a long or short character message through vibration instead of a bell sound. Additionally, a vibration generating apparatus is embedded in a game operation device to provide reality in a game to a user by generating a vibration effective sound, thereby increasing enjoyment and interest in the game.

Further, as technology is developed, a person can also enjoy not only communication but also playback and sending/receiving of multimedia, internet, game, etc., with a mobile phone. Furthermore, internet or playback of moving pictures is available with a game device. Playback of music or moving pictures, internet and games are also available with a moving picture reproducer. Most of these devices have vibration generating devices on the inside so as to multiply interest and such conventional vibration generating devices are using a small vibration motor.

Meanwhile, a vibration motor is classified generally as either a flat type vibration motor or a bar type vibration motor depending on its shape, as shown in FIGS. 1 and 2. In a conventional vibration motor, a vibration is mainly produced by the rotation of an eccentric weight body.

FIG. 1 shows schematically a conventional flat type vibration motor disclosed in Korean Patent No. 389,631, wherein an eccentric rotary unit 2 including a coil 6 and a bearing 7 rotates around a shaft 1 with rotational force generated by the current flowing through a coil 6 and the magnetic field of a permanent magnet 3, thereby to produce vibration due to eccentricity. The current flowing through the coil 6 is controlled via a commutator 5 and a brush 4, thereby to produce smoothly rotational force. In this vibration motor, when motor power on, a vibration is produced by the rotation of the eccentric rotational part 2 and then it stops when motor power off.

Further, FIG. 2 shows schematically a conventional bar type vibration motor disclosed in Korean Patent Application Publication No. 2005-0086150, wherein a rotary unit including a shaft 20, a coil 19, a commutator 18 and an eccentric pendulum 13 rotates due to an operation of current flowing through a permanent magnet 17 and the coil 19 to produce vibration by the eccentric pendulum 13. At this time, the current supplied to the coil 19 rotating is controlled by the commutator 18 and the brush 16 so as to produce smooth rotational force. A vibration is produced by the rotation of the eccentric pendulum 13 due to the rotation of the rotational part when a power source is applied to the motor and then it stops when the power source is cut off.

FIG. 3 shows schematically a vibration generating device using reciprocating motion among the conventional flat type vibration motors, which is disclosed in Korean Patent Application Publication No. 2005-0122101. In the device shown in FIG. 3, when a current is applied to a coil 35 with a weight pendulum 34 fixed to a spring 31, a magnetic circuit running through a permanent magnet 36, a yoke 32 and the coil 35 is formed. At this time, an attractive force and a repulsive force are produced between the permanent magnet 36 and the wound coil 35, and the part including the weight pendulum 34 is moved by the attractive force and the repulsive force while it hangs on the spring 31. Here, when the current is applied inversely to the coil 35, the weight pendulum 34 is moved up and down, thereby producing a vibration. In cases of the conventional vibration generating devices using the rotation of a member having eccentricity as described above, they use the rotation of a motor. However, since the rotation number of a motor is determined in accordance with its design, a motor used in the vibration generating devices rotates only for a predetermined time period when a current is applied to produce a vibration. Accordingly, On/Off for producing the vibration can be controlled, but the frequency and amplitude of the vibration may not be controlled freely and further it is extremely difficult to produce a single vibration.

Additionally, FIG. 4 shows schematically a conventional device having a structure capable of being impactive-vibrated, which is disclosed in Korean Patent No. 1,084,715. In this device, the direction of a current flowing through a coil 41 is controlled and an attractive force and a repulsive force between the coil and a magnet 42 facing to the coil exist, thereby the magnet 42 collides with the coil 41 and a support plate 43 to produce a vibration. Here, the magnet 42 reciprocates while it 42 serves as a weight pendulum. In the case of such a reciprocating type device, the intensity of the vibration is small as compared to the volume of the device, and also there is a limitation to using it on a resonance region.

FIG. 5 shows an example of a method for controlling the amount of vibration in a conventional portable communication terminal. In FIG. 5, an ON/OFF signal coding portion 50 of a portable communication terminal produces a signal to be applied to a vibration motor 52 and the voltage to be applied to the vibration motor 52 is on/off in accordance with the signal at a switch portion 54 to rotate/stop the vibration motor 52. Accordingly, the vibration is produced while the voltage is applied, whereas the vibration is not produced while the voltage is not applied.

FIG. 6 shows a configuration of a conventional game device disclosed in Korean Patent No. 563,391. As shown in FIG. 6, an image output device 64 is connected to a game console 60 that runs the game contents and controls the game, the game is executed through a plurality of operation buttons, and a game controller 62 for sending and receiving data is connected to the game console. Further, a vibration motor 66 for producing vibration is embedded in the game controller. In this device, the vibration motor rotates at a high speed to produce vibration when voltage is applied to the vibration motor in accordance with the signal produced from the game console 60, According to a related art, control of a vibration in a portable terminal or a game controller is mainly carried out by changing the voltage to produce different vibrations, but there is no other technology for controlling vibration in the portable terminal or the game controller.

DISCLOSURE

Technical Problem

Generally, according to a related art, a vibration is provided by using either the vibration produced by rotating an eccentric weight body of with a vibration motor or the vibration produced due to a reciprocating motion of a weight body at a resonance region. However, when using the eccentric weight body, since the vibration magnitude is very small while the vibration motor starts and reaches a normal speed, it is not practical to use. Further, since the vibration motor rotates at a constant speed after reaching a normal state, it is difficult to produce the vibration within a short start-on time of the vibration motor and it is also very difficult to control the cycle or the frequency of vibration generations. Moreover, in case of using the vibration motor, it is extremely difficult to produce a single vibration where the vibration occurs instantly.

Further, in the case of a conventional reciprocating type vibration motor, a driving control circuit is provided and thus it is possible to control the frequency of vibrations within a defined range. However, the intensity of the vibration is small as compared to the volume of the motor and the size of a magnet becomes large, thereby increasing its cost. Additionally, in the conventional reciprocating type vibration motor, power consumption is increased greatly in order to increase the magnitude of vibration and thus there is a limitation to use the motor at a resonance region. Further, a manufacturing process of the motor to correspond with the resonance region is also difficult, thereby decreasing productivity. Additionally, when the motor is moved resonantly, it is difficult to control the cycle or the frequency of vibrations. Thus, in a related art, the reciprocating type vibration motor is driven only by on-offing a power source at a resonance region.

A vibration control in a related art uses a rotation speed change due to a control of voltage or On/Off of vibration generating due to On/Off of a power source, thus it is difficult to control the cycle or the frequency of vibration generations, and the vibration remains even after the power source is cut off and the remaining vibration disappears gradually.

Also, according to a related art, it is difficult to produce a single vibration and it is difficult to produce a sharp and strong instant vibration such as an impactive vibration.

The present invention has been proposed to solve the above drawbacks and an object of the present invention relates to providing an impactive vibration generating apparatus and application devices using the same, wherein according to the present invention, a sharp and strong vibration, i.e., an impactive vibration, can be produced with a simple configuration and the generating cycle and frequency of impactive vibrations can be controlled freely, thereby increasing interest and reality for a person who uses a game device, a portable communication terminal such as a cellular phone, or a multimedia player, etc.

Technical Solution

In order to achieve the above object, an impactive vibration generating apparatus according to an embodiment of the present invention may include: a fixing unit in which an opening is formed and on the outer circumference of which a coil is arranged; a rotary unit in which a shaft is arranged in the opening of the fixing unit and a magnet is installed on the inner circumferential surface, surrounding the fixing unit, and a center connected to the shaft rotates around the fixing unit; at least one protrusion that is attached to one part of the rotary unit and rotates together with the rotary unit; and at least one stopper that contacts the protrusion so as to interrupt the rotation of the rotary unit when the rotary unit rotates.

An impactive vibration generating apparatus according to an embodiment of the present invention may include: a shaft; a rotary unit which is arranged around the shaft and includes a coil rotating together with the shaft; a fixing unit which surrounds the rotary unit and is provided with a magnet therein; a commutator which is arranged coaxially on a circumference of the shaft and is connected to the coil; at least one pair of brushes to slidably contact the commutator; one protrusion that is attached to one part of the rotary unit and rotates together with the rotary unit; and a stopper that contacts the protrusion so as to interrupt the rotation of the rotary unit when the rotary unit rotates.

An impactive vibration generating apparatus according to an embodiment of the present invention may include: a fixing unit in which an opening is formed and on an outer circumference of which a coil is arranged; a rotary unit in which a shaft is arranged in the opening of the fixing unit, a magnet is arranged to form an air gap in an axial direction of the rotation with the coil, and a center of which is connected to the shaft and rotates around the fixing unit; a protrusion which is attached to one part of the rotary unit and rotates together with the rotary unit; and a stopper that contacts the protrusion so as to interrupt the rotation of the rotary unit when the rotary unit rotates.

An impactive vibration generating apparatus according to an embodiment of the present invention may include: a rotary unit in which an opening is formed and a coil is arranged on the outer circumference and rotates; a fixing unit in which a shaft is arranged in the opening of the rotary unit and a magnet is installed to form an air gap in an axial direction of the rotation with the coil; a commutator which is arranged coaxially with the shaft and is connected to the coil; at least one pair of brushes to slidably contact the commutator; at least one protrusion that is attached one part of the rotary unit and rotates together with the rotary unit; and at least one stopper that contacts the protrusion so as to interrupt the rotation of the rotary unit when the rotary unit rotates.

An impactive vibration generating apparatus according to an embodiment of the present invention may include: a shaft; a rotary unit in which the shaft is arranged at its center and a magnet is arranged around the shaft to rotate; a fixing unit in which a coil is installed to support the shaft and form an air gap in a radial direction of rotation with the magnet; at least one protrusion that is attached to one part of the rotary unit and rotates together with the rotary unit; and at least one stopper that contacts the protrusion so as to interrupt the rotation of the rotary unit when the rotary unit rotates.

An impactive vibration generating apparatus according to an embodiment of the present invention may include: a shaft; a rotary unit in which the shaft is arranged at its center and a coil is arranged around the shaft to rotate; a fixing unit in which a magnet is installed to surround the rotary unit and to form an air gap in a radial direction of the rotation with the coil; a commutator which is arranged coaxially to the shaft on the circumference of the shaft and connected to the coil; at least one pair of brushes to slidably contact the commutator; at least one protrusion that is attached to one part of the rotary unit and rotates together with the rotary unit; and at least one stopper that contacts the protrusion when the rotary unit rotates so as to interrupt the rotation of the rotary unit.

An impactive vibration generating apparatus according to an embodiment of the present invention may include: a shaft; a rotary unit in which the shaft is arranged at its center and a magnet is arranged around the shaft to rotate; a fixing unit in which a coil is installed to support the shaft and form an air gap in an axial direction of rotation with the magnet; at least one protrusion that is attached to one part of the rotary unit and rotates together with the rotary unit; and at least one stopper that contacts the protrusion when the rotary unit rotates so as to interrupt the rotation of the rotary unit.

An impactive vibration generating apparatus according to an embodiment of the present invention may include: a shaft; a rotary unit in which the shaft is arranged at its center and a coil is arranged around the shaft to rotate; a fixing unit in which a magnet is installed to support the shaft and form an air gap in an axial direction of rotation with the coil; commutator which is arranged coaxially to the shaft on the circumference of the shaft and connected to the coil; at least one pair of brushes to slidably contact the commutator; at least one protrusion that is attached to one part of the rotary unit and rotates together with the rotary unit; and at least one stopper that contacts the protrusion so as to interrupt the rotation of the rotary unit when the rotary unit rotates.

Further, an impactive vibration generating apparatus according to an embodiment of the present invention may further include a bearing arranged on an outer circumference of a shaft and the magnet may be an electro-magnet around which a coil is wound.

In an impactive vibration generating apparatus according to an embodiment of the present invention, the coil may be wound around a winding-core, at least one of the protrusions and the stopper may be provided as a plurality, an elastic member may be provided to at least one of the protrusions and the stopper or at least one of the protrusions and the stopper may be made of elastic material, and the stopper may be provided outside the impactive vibration generating apparatus.

An impactive vibration generating apparatus according to an embodiment of the present invention may include a circuit board which is connected electrically to the coil in the fixing unit, and an effect sound may be produced by the contact sound between the protrusion and the stopper.

A game controller according to an embodiment of the present invention may include: a plurality of game operating buttons to produce game operating signals; a controller which transmits the operating data acquired from the plurality of game operating buttons and receiving the transmission data; and an impactive vibration generating apparatus to produce impactive vibration in accordance with the signal from the controller.

A game device according to an embodiment of the present invention may include: a console which controls a game state, processes data, and transmits and receives a signal to and from the surrounding devices; an output unit which is connected to the console and outputs an image or sound; a game controller which transmits and receives a signal to and from the console and produces a signal by an operation of a user; and an impactive vibration generating apparatus which produces the impactive vibration in accordance with the signal from the game controller.

A communication terminal according to an embodiment of the present invention may include: a controller for processing a signal and controlling device; an input unit for transmitting an input signal to the controller; a sending/receiving unit which transmits and receives a signal and is connected to the controller; an output unit which is connected to the controller and outputs an image or sound; and an impactive vibration generating apparatus which produces an impactive vibration in accordance with the signal from the controller.

A game controller according to an embodiment of the present invention may include: a plurality of game operating buttons to produce game operating signals; a controller which transmits the operating data acquired from the plurality of game operating buttons and receiving the transmission data; and an impactive vibration generating apparatus to produce an impactive vibration in accordance with the signal from the controller, wherein the impactive vibration generating apparatus includes: a fixing unit; a rotary unit which rotates with respect to the fixing unit; at least one protrusion that is attached to one part of the rotary unit and rotates together with the rotary unit; and at least one stopper that contacts the protrusion when the rotary unit rotates so as to interrupt the rotation of the rotary unit.

A game device according to an embodiment of the present invention may include: a console which controls a game state, processes data, and transmits and receives a signal to and from the surrounding devices; an output unit which is connected to the console and outputs an image or sound; a game controller which transmits and receives a signal to and from the console and produces a signal by an operation of a user; and an impactive vibration generating apparatus which produces the impactive vibration in accordance with the signal from the game controller, wherein the impactive vibration generating apparatus includes: a fixing unit; a rotary unit which rotates with respect to the fixing unit; at least one protrusion that is attached one part of the rotary unit and rotates together with the rotary unit; and at least one stopper that contacts the protrusion when the rotary unit rotates so as to interrupt the rotation of the rotary unit.

A communication terminal according to an embodiment of the present invention may include: a controller for processing a signal and controlling device; an input unit for transmitting an input signal to the controller; a sending/receiving unit which transmits and receives a signal and is connected to the controller; an output unit which is connected to the controller and outputs an image or sound; and an impactive vibration generating apparatus which produces an impactive vibration in accordance with the signal from the controller, wherein the impactive vibration generating apparatus includes: a fixing unit; a rotary unit which rotates with respect to the fixing unit; at least one protrusion that is attached to one part of the rotary unit and rotates together with the rotary unit; and at least one stopper that contacts the protrusion when the rotary unit rotates so as to interrupt the rotation of the rotary unit.

A multimedia player device according to an embodiment of the present invention may include: a controller for processing a signal and controlling device; an input unit for transmitting an input signal to the controller; a sending/ receiving unit which transmits and receives a signal and is connected to the controller; an output unit which is connected to the controller and outputs image or sound; and an impactive vibration generating apparatus which produces an impactive vibration in accordance with the signal from the controller, wherein the impactive vibration generating apparatus includes; a fixing unit; a rotary unit which rotates with respect to the fixing unit; at least one protrusion that is attached one part of the rotary unit and rotates together with the rotary unit; and at least one stopper that contacts the protrusion when the rotary unit rotates so as to interrupt the rotation of the rotary unit.

An input device for a computer according to an embodiment of the present invention may include an impactive vibration generating apparatus, wherein the impactive vibration generating apparatus includes; a fixing unit; a rotary unit which rotates with respect to the fixing unit; at least one protrusion that is attached to one part of the rotary unit and rotates together with the rotary unit; and at least one stopper that contacts the protrusion so as to interrupt the rotation of the rotary unit when the rotary unit rotates. The input device for a computer may comprise a mouse.

Advantageous Effects

According to an impactive vibration generating apparatus, sharp and strong impactive vibrations are produced by using a principle where when an object moves at a certain speed and contacts another object, an impactive vibration is produced in proportion to the speed and weight of the moving object, and it is possible to produce a single impactive vibration, only a small number of impactive vibrations, or a strong vibration due to continuous impactive vibrations. In addition, the frequency or the cycle of the generation of the impactive vibrations can be adjusted, thereby to enable communication or signal transmission which is performed in a game console, a portable terminal such as a mobile phone, or a multimedia player devices.

Further, according to an impactive vibration generating apparatus of the present invention, a single impactive vibration or continuous vibrations can be produced corresponding to an input signal from a button, a key pad or a touch screen, etc. by using a single impactive vibration. In addition, in case the impactive vibration generating apparatus is applied to a game, the impactive vibration corresponding to the contents of a game is felt instead of a simple vibration, thereby maximizing the reality between the game and a user.

Additionally, according to an impactive vibration generating apparatus of the present invention, it is used as vibration means allowing a user to feel really a physical vibration corresponding to the contents executed by controlling the cycle and the frequency of the impactive vibration generation. It is not only vibration means vibrated simply. Thus, it can increase the reality and interest in the multimedia contents in an application device using the impactive vibration generating apparatus of the present invention.

Additionally, the impactive vibration generating apparatus of the present invention can be used as an inexpensive signal means for the blind by converting the physical feeling into a signal through the control of the cycle and the frequency of the impactive vibrations.

BEST MODE FOR THE INVENTION

Figure 1:
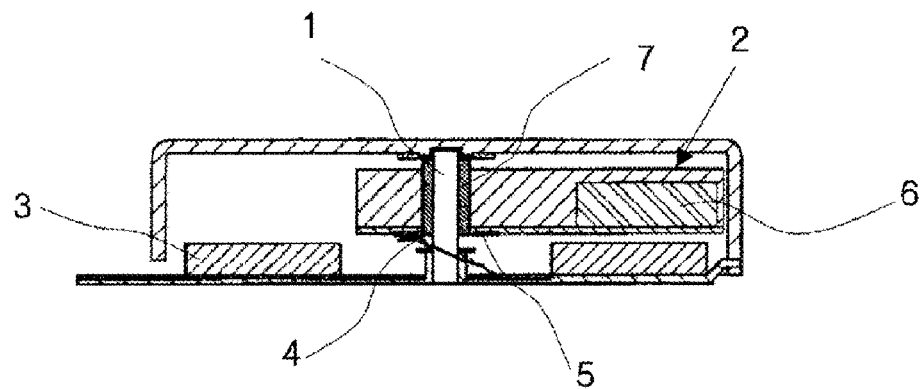
FIG. 1 is a perspective view illustrating schematically a conventional flat type vibration motor.
Figure 2:
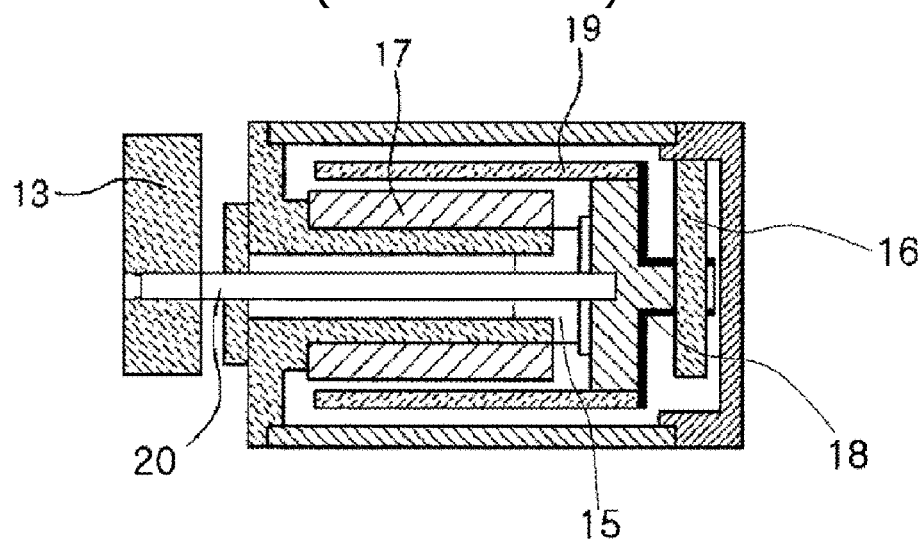
FIG. 2 is a perspective view illustrating schematically a conventional bar type vibration motor.
Figure 3:
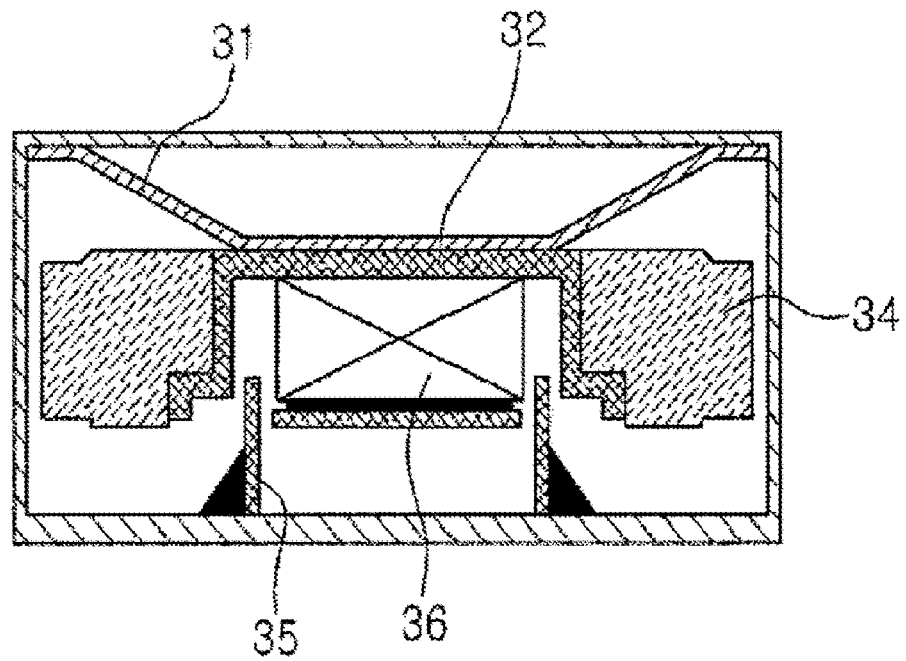
FIG. 3 is a perspective view illustrating schematically a conventional reciprocating flat type vibration motor.
Figure 4:
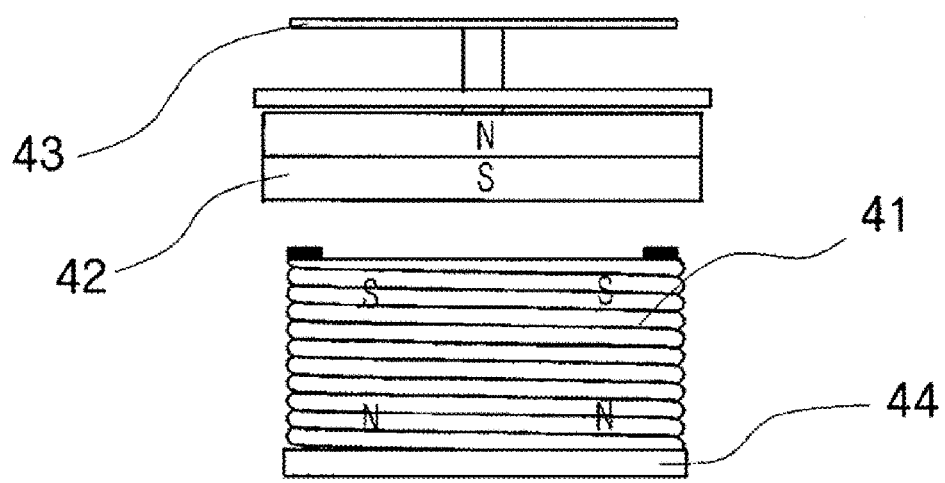
FIG. 4 is a conceptual view illustrating schematically a conventional reciprocating impactive vibration device.
Figure 5:
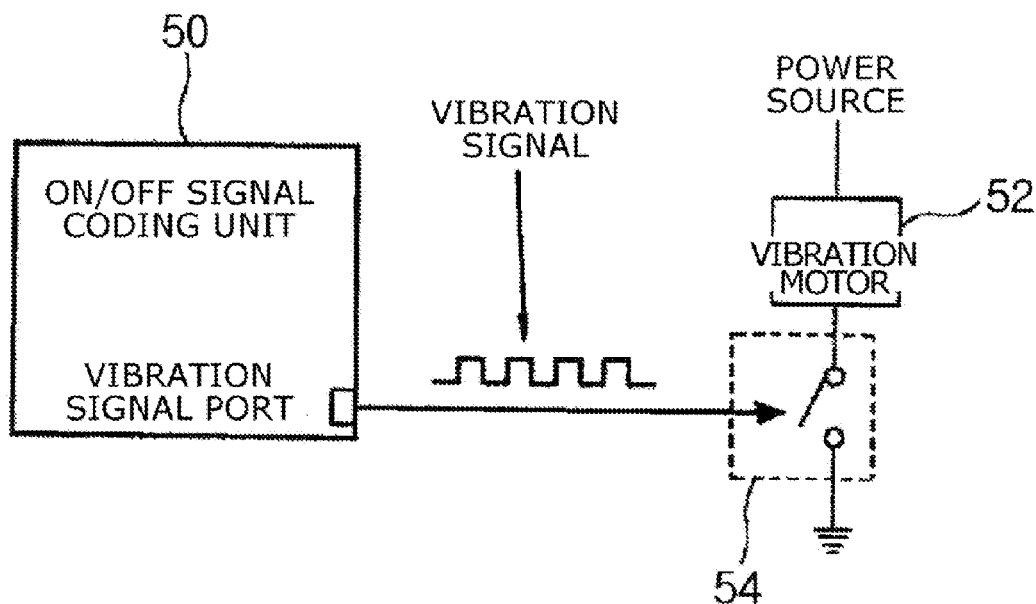
FIG. 5 is an embodiment of methods for controlling the vibration in a conventional portable terminal.
Figure 6:
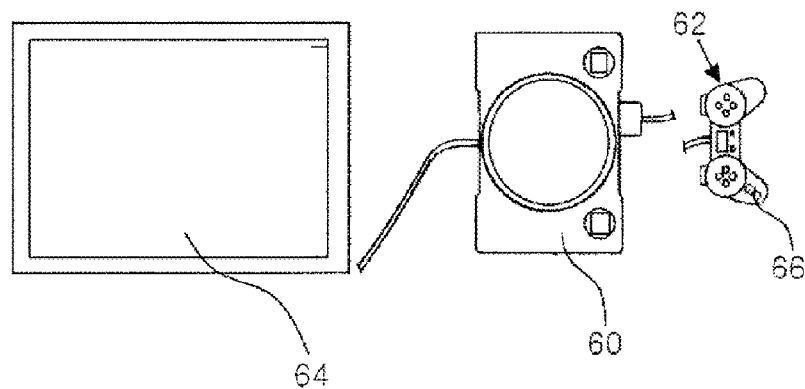
FIG. 6 is a perspective view illustrating schematically a conventional game console.

The objects, features and advantageous effects as stated above will be obvious through the following embodiments of the present invention, which will be described with reference to the accompanying drawings.

The special configurations and functional descriptions are merely exemplary for describing the embodiments according to the present invention, and further the embodiments of the present invention may be replaced by various modifications, and thus should not be construed as limiting thereto.

The embodiments according to a concept of the present invention may be changed variously and have various types and thus the special embodiments will be illustrated in the drawings and described in the specification. However, the embodiments according to a concept of the present invention are not limited to the specifically disclosed types and thus it should be understood that it includes all modifications and equivalents or replacements included within a spirit and a scope of the present invention.

Although terms like a first and a second are used to describe various components, the components are not limited to these terms. These terms are used only to differentiate one component from another, for example, the first component can be referred to as the second component, or the second component can be referred to as the first component, without departing from the scope of the present invention.

It also should be understood that when it is stated that one component is "connected" or "coupled" to another component, even though the one component may be directly connected or coupled to the other component, there may be other components between them. However, it has to be understood that when it is stated that one component is "directly connected" or "directly coupled" to another component, there is no intermediate component between them. The terms used for describing a relation among other components, that is, "between", "right between", "adjacent to" or "directly adjacent to" have to be construed similarly.

The terminology used herein is for the purpose of describing particular embodiments only and is not intended to be limiting to the embodiments. As used herein, unless otherwise defined, the singular forms "a," "an" and "the" are intended to include the plural forms as well. Unless the context indicates otherwise, it will be further understood that the terms "comprises" and/or "having" when used in this specification, specify the presence of stated features, integers, steps, operations, elements, and/or components, but do not preclude the presence or addition of one or more other features, integers, steps, operations, elements, components, parts or combination thereof.

All terms including technical or scientific terminology used herein have the same meaning as commonly understood by one of ordinary skill in the art to which the example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, reference numerals will be made in detail to various embodiments of the present invention, examples of which are illustrated in the accompanying drawings and described below. In the drawings, the same reference numerals refer to the same components.

An impactive vibration generating apparatus according to an embodiment of the present invention uses an impact phenomenon produced when an object moves at a certain speed to contact another object. When the object moves at a certain speed and contacts another object, the impact force is generated due to a collision to produce a sharp and strong vibration, i.e., an impactive vibration. The magnitude of the impactive vibration is determined by a weight and the speed. In the impactive vibration generating apparatus according to an embodiment of the present invention, the impactive force of two objects is generated as needed, thereby to achieve the purpose of the present invention. Further, a motor is used as the means for moving an object and the impactive vibration is produced in proportion to a weight and a rotation speed of a rotary unit which rotates in the motor.

Hereinafter, an impactive vibration generating apparatus according to an embodiment of the present invention will be described in detail.

Figure 7:
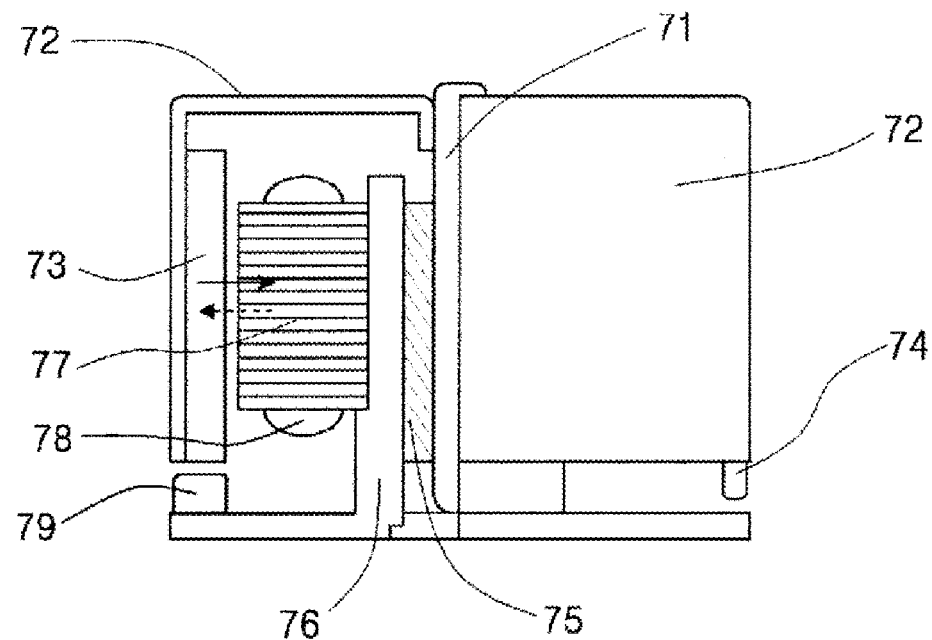
FIG. 7 is a sectional view and appearance view illustrating schematically an impactive vibration generating apparatus in an outer part rotation type according to an embodiment of the present invention.

FIG. 7 is a sectional view and appearance view illustrating schematically an impactive vibration generating apparatus in an outer part rotation type according to an embodiment of the present invention. The impactive vibration generating apparatus is provided with a rotary unit at the center thereof, in which a shaft 71 is arranged. The rotary unit may include a rotation-case 72 and a magnet 73. In more detail, the rotary unit may include the shaft 71 to be extended in a lengthwise direction and the rotation-case 72 to form an inner space such that the shaft 71 is arranged to coincide with a central axis thereof. Further, a magnet 73 is connected to the rotation-case 72 such that the magnet is arranged around the shaft 71 to be rotated. Preferably, the magnet 73 is connected to an inner peripheral surface of the rotation-case 72 to be rotated together with the rotation-case 72. Additionally, the rotation-case 72 is provided with a protrusion 74 that may be connected to the shaft 71, etc., such that the protrusion rotates together with the rotation-case 72 or the shaft 71. Here, since the protrusion 74 may be configured to be rotated together with the rotary unit, the protrusion 74 may be connected to other elements that can rotate. However, the protrusion 74 has to be arranged such that it is separated from a stopper 79, which will be described later.

Meanwhile, a fixing unit for supporting the rotary unit may include a holder 76 and a coil 78. In more detail, the fixing unit is provided with the holder 76 on which the shaft 71 is supported at the center of the fixing unit to arrange the shaft 71 thereof, and the coil 78 is connected to the holder 76 such that it is arranged around the shaft 71 to face the magnet 73. The shaft 71 may be supported by an opening formed in the holder 76 to save costs; however, it may be supported by a separate member that is connected to the center of the holder 76. Further, the holder 76 may be provided with a bearing 75 having an opening into which the shaft 71 is inserted, wherein the bearing 75 can be received in the opening formed at a center of the holder 76. The coil 78 may be wound around a winding-core 77 that supports the coil 78 and is made of a magnetic material, thereby to maximize magnetic efficiency. However, the winding-core 77 may be made of a non-magnetic material or omitted so as to save costs or miniaturize the device. Additionally, a stopper 79 may be provided in the fixing unit to be in contact with the protrusion 74 when the rotary unit rotates, thereby interfering with the rotation of the rotary unit. Here, the stopper 79 may be arranged at any location of the fixing unit, it only needs to be in contact with the protrusion 74 and interferes with the rotation of the rotary unit when the rotary unit rotates.

The shaft 71 arranged at the center of the rotary unit is supported by the fixing unit. Preferably, the shaft 71 is inserted into the bearing 75 that is arranged at the center of the holder 76 and the rotation-case 72 to which the magnet 73 of the rotary unit is connected surrounds the coil 78 of the fixing unit. Further, the magnet 73 of the rotary unit faces the coil 78 of the fixing unit to form an air gap in the radial direction of rotation. In an impactive vibration generating apparatus according to an embodiment of the present invention as configured above, the stopper 79 is configured to contact the protrusion 74 when the rotary unit rotates to interrupt the rotation of the rotary unit.

Figure 10:
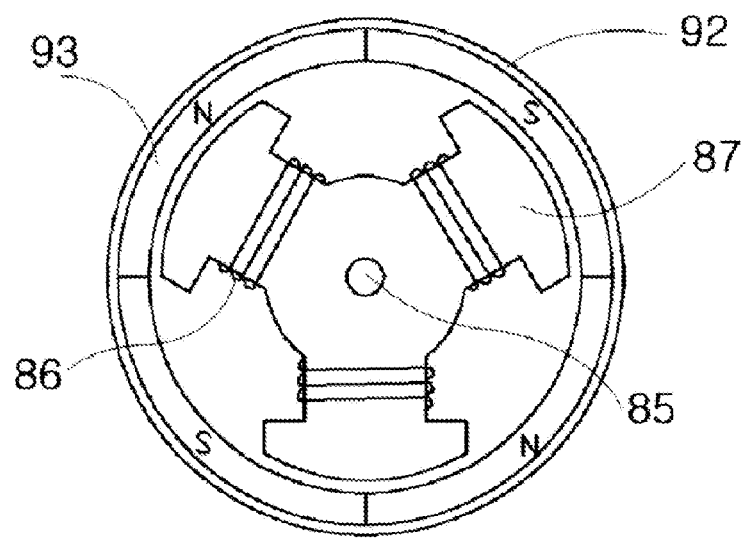
FIG. 10 is a conceptual view illustrating the section configuration taken along A-A' in FIG. 9.

Here, a clearance that is formed by facing the magnet 73 of the rotary unit and the coil 78 of the fixing unit refers to as "an air gap", wherein a flow of magnetic flux produced in the magnet 73 is formed in the air gap. Further, when the coil 78 is wound around the winding-core 77, the air gap is formed between the magnet 73 and the winding-core 77. The flow of the magnetic flux formed in the air gap is directed toward the coil 78 from the magnet 73 as indicated as a solid arrow in FIG. 7 when a polarity of the magnet 73 is N pole. On the contrary, the flow of the magnetic flux is directed toward the magnet 73 from the coil 78 as indicated by a dotted arrow in FIG. 7 when a polarity of the magnet 73 is S pole. As indicated with the solid arrow and the dotted arrow in FIG. 7, the flow of magnetic flux running through the air gap is formed in a radial direction of rotation, that is, a direction perpendicular to a rotation axis, wherein it is referred to as "a radial air gap". Further, as indicated with the solid arrow and the dotted arrow in FIG. 13, which will be described later, the flow of magnetic flux is formed in the rotation axial direction, that is, a direction in parallel with a rotation axis, wherein it is referred to as an axial air gap. A rotation electric device, i.e., a motor or a generator is provided with the air gap, the flow of magnetic flux capable of producing rotational force between a fixing unit and a rotary unit is formed in the air gap. Here, the air gap is classified as a radial air gap and an axial air gap. This has been well known to persons who work in the industrial fields of motors or generators and thus the detailed description thereof is omitted. As shown in FIG. 10, the wound-coils face said magnet to form the air gaps and at least three wound-coils are arranged with an equal spacing in order to smoothly rotate the rotary unit.

Further, the bearing 75 may be arranged on an outer surrounding of the shaft 71, wherein firstly an outer wheel of the bearing 75 may be connected to an inner peripheral surface of the holder 76 and then the shaft 71 may be connected to an inner peripheral surface of an inner wheel of the bearing 75. Additionally, firstly an inner peripheral surface of the bearing 75 may be connected to an outer peripheral surface of the shaft 71 and then an outer wheel of the bearing 75 may be connected to an inner peripheral surface of the holder 76. Further, the stopper 79 may be formed integrally with the holder 76 by varying a part of the holder. In addition, the holder 76 may be provided separately from a center to support the shaft 71 and two portions that are extended in a radial direction. Meanwhile, the protrusion 74 may be provided integrally with the rotation-case 72 by varying a part of the rotation-case, or provided as a separate member that is connected to the shaft 71.

Figure 8A:
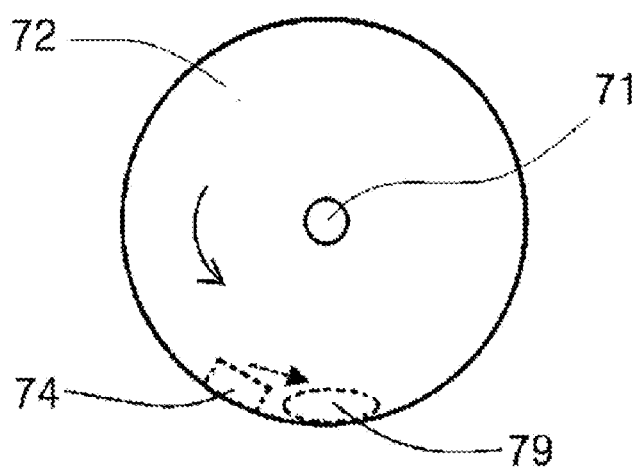
FIGS. 8A and 8B are conceptual views illustrating the operation of the impactive vibration generating apparatus according to an embodiment of the present invention.
Figure 8B:
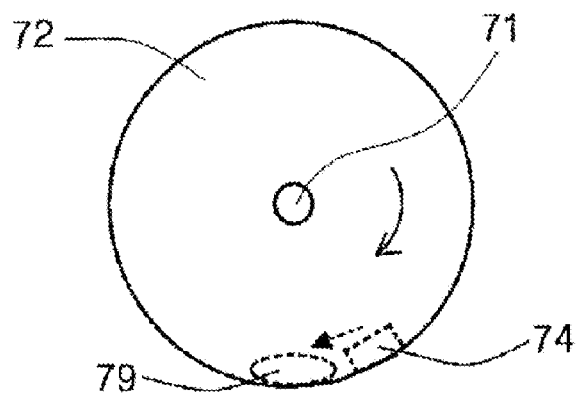

FIGS. 8A and 8B are conceptual views illustrating the operation of the impactive generating apparatus as shown in FIG. 7, according to an embodiment of the present invention. As shown in FIG. 8A, when the rotary unit is rotated counter clockwise, the protrusion 74 rotates together with the rotation-case 72 counter clockwise to collide with the stopper 79 at a rotation speed. Thus, the impactive vibration is generated due to the impact in proportion to the speed and weight of the rotary unit. Further, as shown in FIG. 8B, when the rotary unit is rotated clockwise, the protrusion 74 rotates together with the rotation-case 72 clockwise to collide with the stopper 79, thereby generating the impactive vibration. In this case, the energy that the rotary unit has while it rotates is consumed due to the collision of the protrusion 74 and the stopper 79, thereby eliminating inertial force. Thus, the rotary unit can be rotated or reversely rotated easily. Additionally, since the impactive vibration can be generated due to the impact of the collision of the stopper 79 and the protrusion 74, the vibration is generated instantly and strongly. As apparent from FIGS. 8A and 8B, the rotary unit can rotate less than one revolution, i.e., less than 360 degrees. Further, it is preferable to rotate the rotary unit at a large angle over 180 degrees in order to enlarge an acceleration area of the rotary unit.

The timing, frequency and speed of the collision of the protrusion 74 and the stopper 79 are controlled by the rotation time, the reciprocal rotation frequency and the rotation speed of the rotary unit. Thus, the impactive vibration may be controlled freely using the relation between the rotary unit and the collision. In an impactive vibration generating apparatus according to an embodiment of the present invention, a single impactive vibration may be generated by stopping the rotation of the rotary unit by cutting off current flowing to the coil 78 after the protrusion 74 is in contact with the stopper 79 one time. The frequency of impactive vibration generation may be controlled by controlling the cycle or the frequency of the single impactive vibration generation. The frequency of impactive vibration generation may also be controlled by controlling the number of rotating or reverse-rotating the rotary unit. Further, the frequency of the impactive vibration may be controlled by controlling the generation frequency of the impactive vibration through the adjustment of the collision frequency of the stopper 79 and the protrusion 74.

Figure 9:
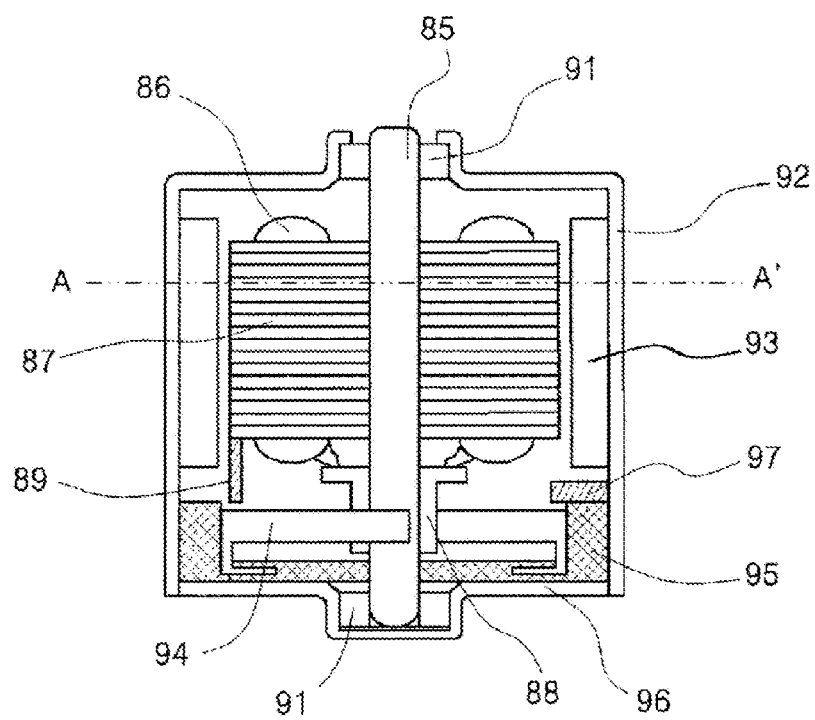
FIG. 9 is a sectional view illustrating schematically an impactive vibration generating apparatus in an inner part rotation type according to an embodiment of the present invention.

FIG. 9 is a sectional view illustrating schematically an impactive vibration generating apparatus in an inner part rotation type according to an embodiment of the present invention. For convenience of explanation, a conceptual view illustrating the configuration of the impactive vibration generating apparatus is shown based on a section taken along A-A in FIG. 9. Referring to FIG. 9, a shaft 85 is arranged at the center thereof, and a rotary unit that may include a coil 86 arranged around the shaft 85 is provided, wherein current flows through the coil. Further, a commutator 88 is provided on the outer surrounding of the shaft 85 to be arranged coaxially with the shaft 85. The commutator 88 is connected to the coil 86 to apply current thereto such that it rotates together with the coil 86. Here, the coil 86 may be wound around a winding-core 87 that supports the coil 86 and is made of a magnetic material, thereby increasing magnetic efficiency. However, the winding-core 87 may be made of a non-magnetic material or omitted so as to save cost or miniaturize the device. Additionally, a protrusion 89 may be provided to rotate together with the coil 86. Here, it is enough that the protrusion 89 is provided to rotate together with the rotary unit and thus it may be connected to other elements that can be rotated. However, the protrusion 89 needs to be separated from the stopper 97, which will be described later.

A fixing unit to support the shaft 85 may include a frame 92 and a magnet 93. In more detail, the frame 92 may form an inner space to surround the rotary unit and one part of the frame may support the shaft 85. The magnet 93 is connected to the frame 92. Preferably, the magnet 93 is connected to an inside of the frame 92 and arranged as if it surrounds the rotary unit. Further, a bearing 91 may be provided, having an opening into which the rotation shaft 85 is inserted therein. The bearing 91 is connected to one part of the frame 92 to support the shaft 85 and a receiving unit for receiving the bearing 91 may be formed integrally on one part of the frame 92. Additionally, a brush 94 slidably contacts the commutator and supplies current to the coil 86 and the brush may be provided as at least one pair. Further, a brush holder 95 for fixing the brush may be provided. The brush holder 95 may be connected to the frame 92 or a support plate 96 which will be described later. In addition, the support plate 96 for supporting the shaft 85 may be connected to the frame 92 to form an inner space together with the frame. A receiving unit for the bearing 91 may be provided at the center of the support plate 96 to support the shaft 85 and the bearing 91 may be arranged therein. Further, the support plate 96 is provided with the stopper 97 to contact the protrusion 89, thereby interfering with the rotation of the rotary unit. The stopper 97 may be formed integrally with the brush holder 95, the frame 92 or the support plate 96 by varying a part of them. The stopper 97 does not necessarily need to be arranged at a specific location, and the stopper may be arranged at any location if it can interrupt the rotation of the rotary unit together with the protrusion 89.

The shaft 85 arranged at the center of the rotary unit is supported rotatably by the frame 92, and the rotary unit may be arranged inside the frame 92 of the fixing unit such that the magnet 93 faces the coil 86 to form an air gap in the radial direction of rotation. The brush 94 may be connected slidably to the commutator 88. Further, the protrusion 89 contacts the stopper 97 to interrupt the rotation of the rotary unit when the rotary unit rotates. The support plate 96 is connected to the shaft to surround the rotary unit together with the frame 92 while it supports one part of the shaft 85.

Further, the bearing 91 may be received into the frame 92 and the support plate 96. The bearing may also be received into a separate receiving space. The magnet 93 is preferably made from a permanent magnet, however, it may be made from an electro-magnet around which coils are wound.

According to an impactive vibration generating apparatus as configured above, the protrusion 89 contacts the stopper 97 to produce the impactive vibration in proportion to the weight and the rotational speed of the rotary unit when the rotary unit rotates, wherein the principle of producing the impactive vibration is identical to that as described in FIG. 8.

Figure 11:
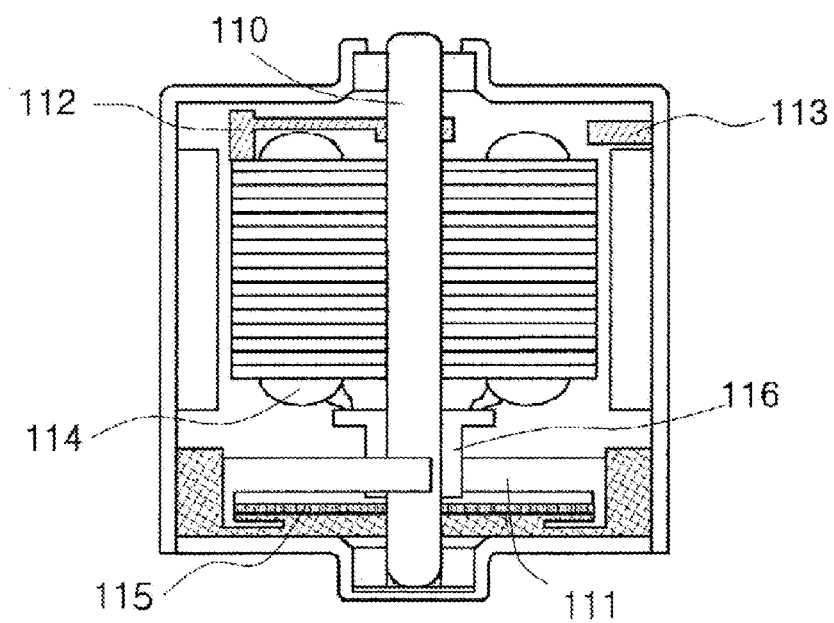
FIG. 11 is a sectional view illustrating schematically an impactive vibration generating apparatus in an inner part rotation type according to another embodiment of the present invention.

FIG. 11 is a sectional view illustrating an impactive vibration generating apparatus according to another embodiment of the present invention wherein the protrusion 112 is provided differently from that in FIG. 9. The impactive vibration generating apparatus according to another embodiment of the present invention, as shown in FIG. 11, includes: a shaft 110 extending in a lengthwise direction; a rotary unit in which a coil is arranged around the shaft 110 and current flows through which the coil; a protrusion 112 connected to the shaft 110; a stopper 113 for interfering with of the rotation of the rotary unit together with the protrusion 112 when the rotary unit rotates; and a circuit board 115 provided with a driving circuit for supplying current necessary for the coil 114 through the brush 111 and the commutator 116. According to the impactive vibration generating apparatus as configured above, the protrusion 112 contacts the stopper 113 to produce the impactive vibration in proportion to the weight and the rotational speed of the rotary unit when the rotary unit rotates, wherein the principle of producing the impactive vibration is identical to that described in FIG. 8.

Figure 12:
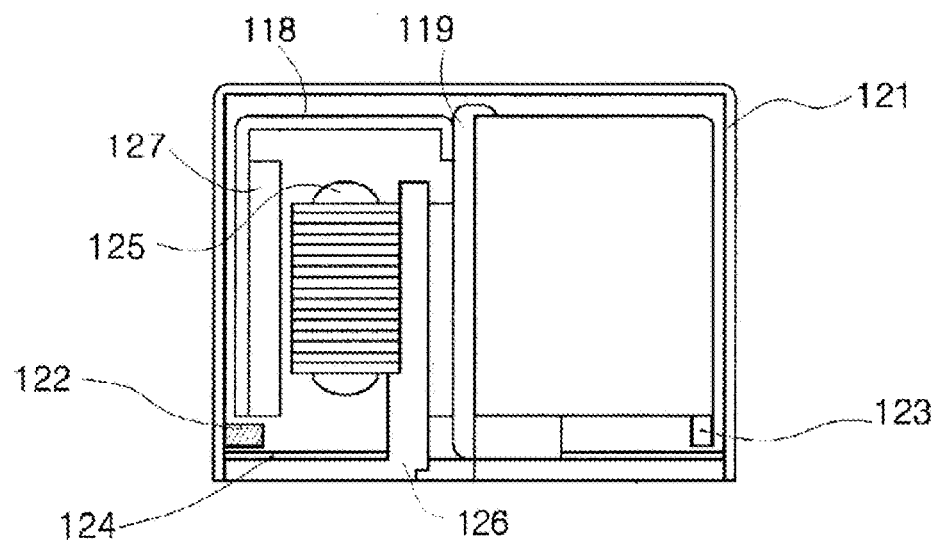
FIG. 12 is a perspective view illustrating schematically an impactive vibration generating apparatus provided with a cover according to another embodiment of the present invention.

FIG. 12 is a perspective view illustrating schematically an impactive vibration generating apparatus in an outer part rotation type according to another embodiment of the present invention. The impactive vibration generating apparatus according to another embodiment of the present invention, as shown in FIG. 12, includes: a shaft 119 extending in the lengthwise direction; a rotary unit including a rotation-case 118 and a magnet 127; a cover 121 for surrounding the rotary unit; a stopper 122 provided on the cover 121; and a protrusion 123 to contact the stopper 122 and interrupt the rotation of the rotary unit when the rotary unit rotates. According to the impactive vibration generating apparatus shown in FIG. 12 of the present invention, the cover 121 protects the rotary unit and blocks noise produced when the stopper 122 contacts the protrusion 123, thereby reducing operation noise. Further, a circuit board 124 is provided around a holder 126 and the circuit board 124 includes a driving circuit for driving the rotary unit. Further, a magnetic pole location detection element for the rotary unit, such as a Hall element, may be provided in the circuit board 124 to constitute a circuit for controlling the current flowing through the coil 125. However, the circuit board 124 may be provided separately from the impactive vibration generating apparatus.

Figure 13:
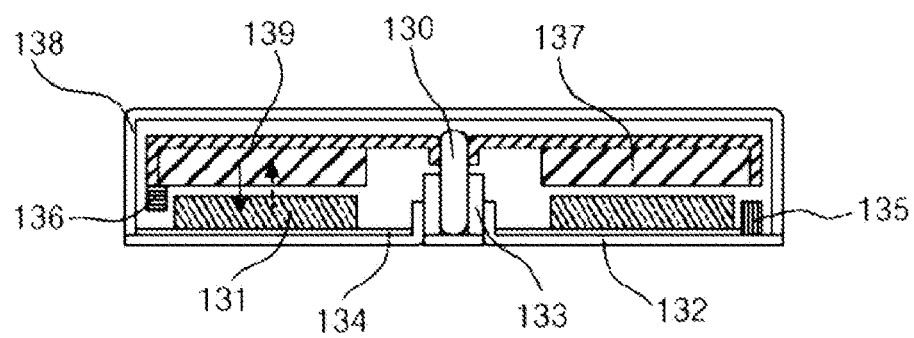
FIG. 13 is a perspective view illustrating schematically an impactive vibration generating apparatus in a flat type where a magnet rotates according to another embodiment of the present invention.

FIG. 13 is a perspective view illustrating schematically an impactive vibration generating apparatus in a flat type where a magnet rotates according to another embodiment of the present invention. The impactive vibration generating apparatus as shown in FIG. 13 is provided with a shaft 130 and a rotary unit including a rotation-case 139 and a magnet 137. In more detail, the impactive vibration generating apparatus is provided with the shaft 130 extending in a lengthwise direction and the rotation-case 139 arranged coaxially with the shaft. Further, in the impactive vibration generating apparatus, the magnet 137 is connected to the rotation-case 139 to be arranged around the shaft such that the magnet 137 rotates together with the rotation-case 139. Additionally, the impactive vibration generating apparatus is provided with a protrusion 136 that is connected to the rotation-case 139 or the shaft 130 and the protrusion is rotated together with the magnet 137. Here, if the protrusion 136 is rotated together with the rotary unit, the protrusion 136 may be connected to other elements that can rotate. However, the protrusion 136 needs to be provided separately from a stopper 135 which will be described later.

The impactive vibration generating apparatus is provided with a fixing unit for supporting the rotary unit wherein the fixing unit may include a fixing plate 132 and a coil 131. In more detail, the shaft 130 is supported at the center of the fixing plate 132, and the coil 131 through which current flows are arranged around the center of the fixing plate 132 to face the magnet 137. Here, the shaft 130 may be supported by an opening formed in the fixing plate 132 to save costs; however, it may be supported by a separate member that is connected to the center of the fixing plate 132. Further, a bearing 133 may be provided, having an opening into which the shaft 130 is inserted therein. The bearing 133 can be received in the separate receiving space that is provided at the center of the fixing plate 132. Here, the coil 131 may be wound around a winding-core that supports the coil 131 and made of a magnetic material to maximize a magnetic efficiency. However, the winding-core may be omitted so as to save costs or miniaturize the device. Additionally, a stopper 135 may be provided in the fixing unit to contact the protrusion 136 when the rotary unit rotates, thereby interfering with the rotation of the rotary unit. Here, the stopper 135 may be arranged at any location of the fixing unit if the stopper contacts the protrusion 136 to interrupt the rotation of the rotary unit when the rotary unit rotates.

The shaft 130 arranged at the center of the rotary unit is arranged at the center of the fixing unit, and preferably the shaft 130 is inserted into the opening of the bearing 133 such that the magnet 137 of the rotary unit faces the coil 131 to form an air gap in the axial direction of rotation. The stopper 135 contacts the protrusion 136 when the rotary unit rotates, thereby interfering with the rotation of the rotary unit.

Here, the clearance that is formed by facing the magnet 137 of the rotary unit and the coil 131 of the fixing unit refers to as "an air gap", wherein a flow of magnetic flux produced in the magnet 137 is formed in the air gap in FIG. 13. Further, when the coil 131 is wound around the winding-core, the air gap is formed between the magnet 137 and the winding-core. The flow of the magnetic flux formed in the air gap is directed toward the coil 131 from the magnet 137 as indicated as a solid arrow in FIG. 13 when a polarity of the magnet 137 is N pole. On the contrary, the flow of the magnetic flux is directed toward the magnet 137 from the coil 131 as indicated by a dotted arrow in FIG. 13 when a polarity of the magnet 137 is S pole. As indicated with the solid arrow and dotted arrow in FIG. 13, the flow of magnetic flux running through the air gap is formed in the direction of a shaft, i.e., a direction perpendicular to a shaft, wherein it refers to as a axial air gap. As shown in FIG. 10, the wound-coils face said magnet to form the air gaps and at least three wound-coils are arranged with an equal spacing in order to smoothly rotate the rotary unit.

Further, the impactive vibration generating apparatus is provided with a cover 138 to protect the rotary unit by surrounding it. In addition, a circuit board 134 may include a driving circuit for driving the rotary unit. Further, a magnetic pole location detection element for the rotary unit such as a Hall element is provided in the circuit board 134 to constitute a circuit for controlling the current flowing through the coil 131. Additionally, the stopper 135 may be formed integrally with the fixing plate 132 by varying a part of the fixing plate, and the protrusion 136 may be formed integrally with the rotation-case 139 by varying a part of the rotation-case. Further, the stopper 135 may be formed as a separate member connected to the shaft 130. The part for receiving the bearing 133 may be formed integrally with the fixing plate 132 and the bearing 133 may be connected to the fixing plate 132 without the part for receiving the bearing. Meanwhile, the bearing 133 may be arranged on an outer circumference of the shaft 130, and thus the shaft 130 may be connected to the fixing plate 132 and the bearing 133 may be connected to the rotation-case 139.

According to the impactive vibration generating apparatus as shown in FIG. 13, the protrusion 136 contacts the stopper 135 to produce the impactive vibration in proportion to the weight and the rotational speed of the rotary unit when the rotary unit rotates, wherein the principle of producing the impactive vibration is identical to that described in FIG. 8.

Figure 14:
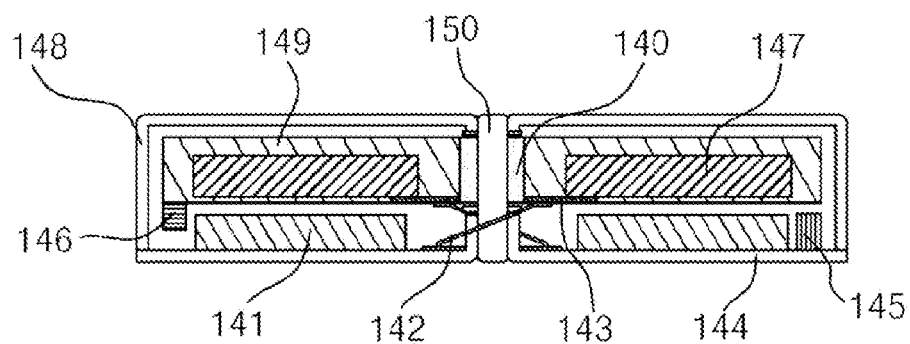
FIG. 14 is a perspective view illustrating schematically an impactive vibration generating apparatus in a flat type where a coil rotates according to another embodiment of the present invention.

FIG. 14 is a perspective view illustrating schematically an impactive vibration generating apparatus in a flat type where a coil rotates according to another embodiment of the present invention. In the impactive vibration generating apparatus as shown in FIG. 14, a shaft 150 is arranged at the center thereof, a rotary unit rotating around a fixing unit is provided, wherein the rotary unit may include a rotation frame 149 and a coil 147. In more detail, in the impactive vibration generating apparatus, the shaft 150 is arranged at the center of the frame 149, and the coil 147 through which current flows is arranged around the shaft within the rotation frame 149, to be rotated together with the frame 149. The shaft 150 may be arranged in an opening formed within the frame 149. Further, a bearing 140 may be provided, having an opening into which the shaft 150 is inserted therein and the bearing may be connected coaxially with the frame 149. In addition, a commutator 143 connected to the coil 147 to apply current thereto is arranged coaxially with a rotation center of the rotation frame 149 to rotate together with the coil 147. Further, the impactive vibration generating apparatus as shown in FIG. 14 is provided with a protrusion 146 to be connected to the rotation frame 149, wherein the protrusion 146 rotates together with the coil 147. Here, the protrusion 146 may rotate together with the rotary unit and thus the protrusion 146 may be connected to other rotator elements. However, the protrusion 146 needs to be separated from a stopper 145, which will be described later. The frame 149 may be molded of plastic material and specially, the frame 149 may be molded by using an insert injection method such that the coil 147, etc. are embedded therein.

The impactive vibration generating apparatus, as shown in FIG. 14, is provided with a fixing unit to support the shaft 150, wherein the fixing unit may include a magnet 141 and a fixing plate 144. In more detail, the shaft 150 is supported at the center of the fixing plate 144 to connect the shaft 150, and the magnet 141 is arranged around the shaft 150 such that it is connected to the fixing plate 144 to be faced with the coil 147. An opening may be formed at the center of the fixing plate 144 to support the shaft 150, however, a separate member may be provided to be connected to the fixing plate 144 so as to support the shaft 150. Further, a brush 142 may slidably contact the commutator 143 and supply current to the coil 147. The brush 142 may be supported by the fixing plate 144 and it is provided as at least one pair. Additionally, a stopper 145 may be provided to contact the protrusion 146, thereby interfering with the rotation of the rotary unit. The stopper 145 may be arranged at any location of the fixing unit if the stopper contacts the protrusion 146 to interrupt the rotation of the rotary unit when the rotary unit rotates.

The shaft 150 supported at the center of the fixing unit is arranged at the center of the frame 149. Preferably, the shaft 150 is inserted into the opening of the bearing 140. The magnet 141 of the fixing unit faces the coil 147 of the rotary unit to form an air gap in the axial direction. The stopper 145 contacts the protrusion 146 to interrupt the rotation of the rotary unit when the rotary unit rotates. Further, the stopper 145 may be formed integrally with the fixing plate 144 by varying a part of the fixing plate. In addition, in the fixing plate 144, a part for supporting the shaft 150 and a part extending to a radial direction may be formed as separate parts. Meanwhile, the protrusion 146 may be provided integrally with the rotation frame 149 by varying a part of the rotation frame, or provided as a separate member to be connected to one part of the rotary unit. In addition, the bearing 140 may be arranged on an outer circumference of the shaft 150, and thus may be connected to the fixing plate 144 to receive the shaft 150. The shaft 150 may be connected to the opening formed at the center of the rotary unit. Further, the impactive vibration generating apparatus may be provided with a cover 148 to support stably the shaft 150 and protect the rotary unit by surrounding it and Additionally, the magnet 141 is preferably made from a permanent magnet, however, it may be made from an electro-magnet around which coils is wound.

Figure 15:
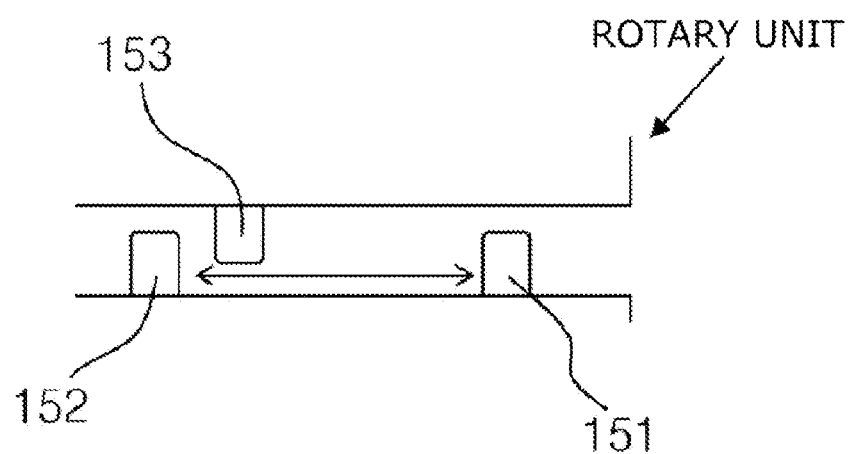
FIG. 15 is a conceptual view illustrating schematically an impactive vibration generating apparatus according to another embodiment of the present invention in which at least one element of a protrusion and a stopper is two or more.

FIG. 15 is a conceptual view illustrating schematically an impactive vibration generating apparatus according to another embodiment of the present invention. In another embodiment, at least one element of a protrusion and a stopper is two or more. For example, one protrusion 153 and two stoppers 151, 152 are provided. A first stopper 152 and a second stopper 151 are provided and a protrusion 153 is disposed between the first stopper 152 and the second stopper 151, and the first protrusion 153 contacts the first stopper 152 and the second stopper 151 when the rotary unit rotates to interrupt the rotation of the rotary unit. For example, in case the rotary unit of the impactive vibration generating apparatus rotates clockwise, the protrusion contacts the first stopper 152 to produce impactive vibrations. On the contrary, in case the rotary unit rotates counter clockwise, the protrusion contacts the second stopper 151 to produce impactive vibrations. At this time, a reciprocating motion speed of the rotary unit is determined, the time required for moving reciprocally the distance between the first stopper 152 and the second stopper 151 is determined. Therefore, it is able to determine a generating frequency of the impactive vibration.

Figure 16:
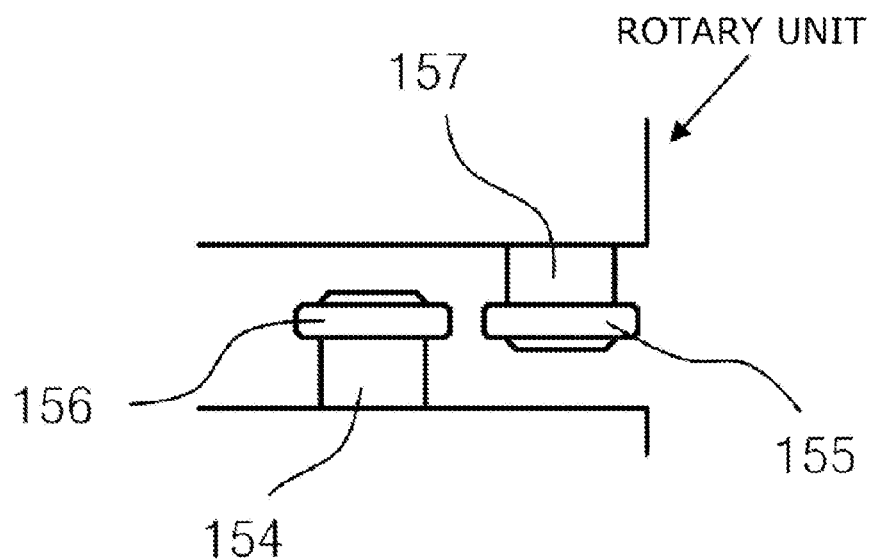
FIG. 16 is a conceptual view illustrating schematically elastic members provided in the protrusion and the stopper of an impactive vibration generating apparatus according to another embodiment of the present invention.

Additionally, in the impactive vibration generating apparatus according to an embodiment of the present invention, as shown in FIG. 16, elastic members 155, 156 may be provided on a protrusion 157 and a stopper 154, respectively. FIG. 16 is a conceptual view illustrating schematically elastic members provided in both the stopper 154 and the protrusion 157. The elastic members 155, 156 may reduce the noise that is produced when the stopper 154 contacts the protrusion 157. For example, the elastic members 155, 156 may be made of rubber, resin, cloth, spring, etc. and further the stopper 154 and the protrusion 157 themselves may be made of an elastic material. In addition, the elastic members 155, 156 may be provided on both the stopper 154 and the protrusion 157, or on only one of them.

Figure 17:
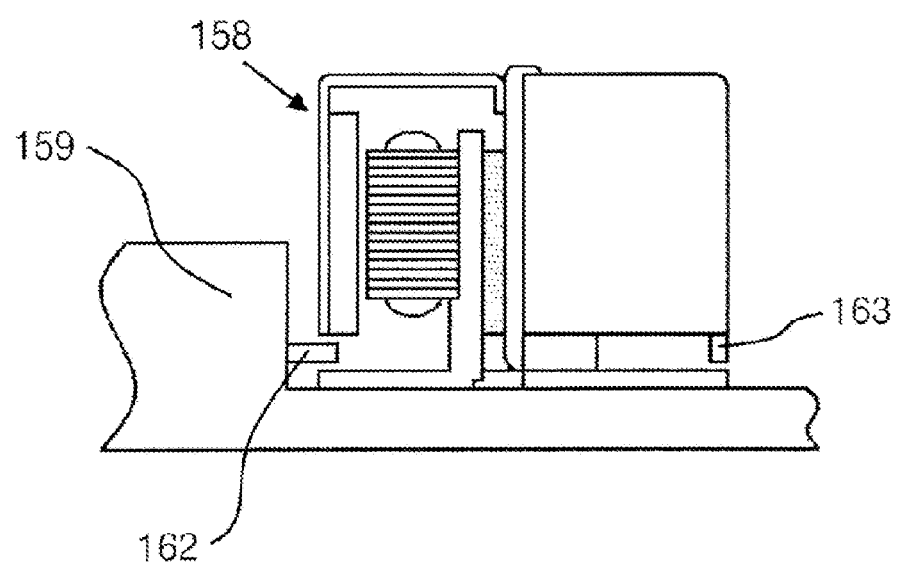
FIG. 17 is a perspective view illustrating schematically a stopper provided on an element outside an impactive vibration generating apparatus according to another embodiment of the present invention.

Further, according to an impactive vibration generating apparatus of an embodiment as shown in FIG. 17, a stopper 162 is provided on a corresponding object 159 outside the impactive vibration generating apparatus, wherein a protrusion 163 is provided on the rotary unit 158 of the impactive vibration generating apparatus, and thus the stopper 162 contacts the protrusion 163 when the rotary unit 158 rotates, thereby to interrupt the rotation of the rotary unit 158. For example, in case the impactive vibration generating apparatus is provided in a portable terminal or a game controller, the stopper 162 may be provided on a case or a frame to which the impactive vibration generating apparatus is connected and thus the protrusion 163 contacts the stopper 162 to produce impactive vibrations when the rotary unit rotates together with the protrusion.

Additionally, in an impactive vibration generating apparatus according to an embodiment of the present invention, different noises are produced when the protrusion contacts the stopper, depending on kinds of materials the stopper and the protrusion consist of. Thus, the materials of the protrusion and the stopper may be selected corresponding to the sound, or the members corresponding to the sound may be provided on the protrusion and the stopper so that the sound produced at the time the protrusion contacts the stopper may be used as an effect sound, thereby increasing reality for a user.

Further, an impactive vibration generating apparatus may be configured by combining randomly the features as described above and thus it may be configured by combining at least one of the following features (A), (B), (C), (D), and (E):

(A) The number of the protrusion and/or the stopper is two or more.

(B) An elastic member is provided on at least one of the protrusion and the stopper.

(C) The stopper is provided in the outside of the impactive vibration generating apparatus.

(D) The winding coil is wound around a winding-core.

(E) A circuit board connected electrically to the coil is provided in the fixing unit.

Additionally, the impactive vibration generating apparatus according to an embodiment of the present invention may be applied to a game console, a game controller, a portable phone, a portable communication device and a multimedia player. Thus, the sharp and strong vibration (i.e., the impactive vibration) may be controlled to produce a single impactive vibration or a small number of vibrations, or strong vibration due to continuous impactive vibrations to maximize the reality for a user of the devices to which the impactive vibration generating apparatus of the present invention is applied.

Figure 18A:
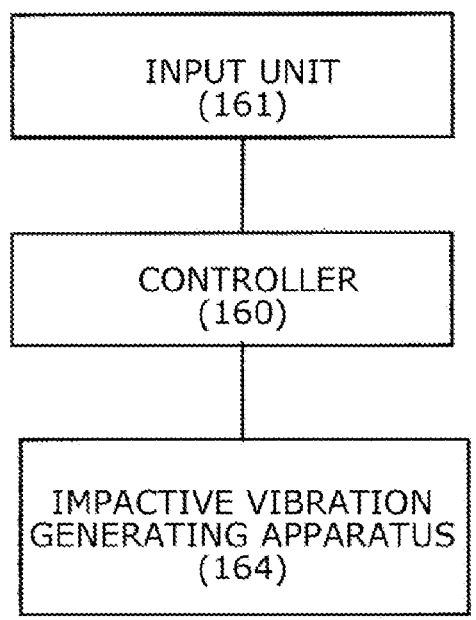
FIGS. 18A, 18B, and 18C are conceptual views illustrating a game controller according to an embodiment of the present invention.
Figure 18B:
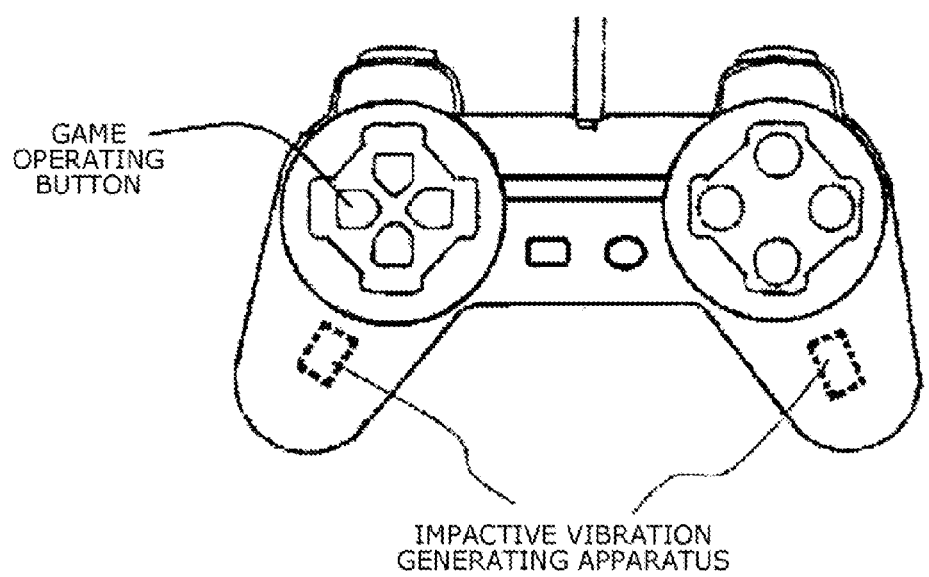
Figure 18C:
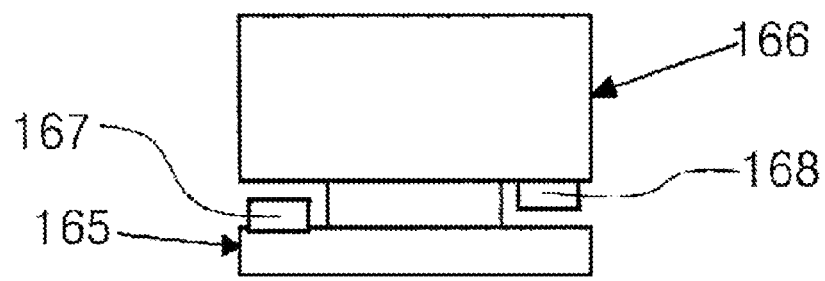

FIG. 18A is a conceptual view illustrating a game controller according to an embodiment of the present invention and it shows a block diagram for controlling a game controller. FIG. 18B is an external conceptual view of a game controller. FIG. 18C is a conceptual view of an impactive vibration generating apparatus 164. The game controller is provided with an input unit including a plurality of game operation buttons such as a button, lever, or switch, etc., to produce game operation signals by operating it with hands. Further, a controller 160 may be provided on the game controller to transmit and receive the signal produced in the input unit. An impactive vibration generating apparatus 164 is operated in accordance with the signal transmitted from the controller 160. The impactive vibration generating apparatus 164 includes a fixing unit 165 and a rotary unit 166 rotating with respect to the fixing unit 165. A stopper 167 is provided on the fixing unit 165 and a protrusion 168 is provided on the rotary unit 166, wherein the protrusion 168 contacts the stopper 167 when the rotary unit 166 rotates to interrupt the rotation of the rotary unit. The stopper 167 may be attached to one part of the fixing unit 165, however, it is not limited thereto and it may be attached to other elements in addition to the fixing unit 165. The impactive vibration generating apparatus according to the embodiments shown in FIGS. 7, 9, 11 to 17, or combination thereof may be used as the impactive vibration generating apparatus 164 for the game controller. According to the game controller as described above, the controller 160 transmits a signal to the impactive vibration generating apparatus 164, corresponding to the contents of a game, and the impactive vibration generating apparatus 164 produces a single impactive vibration or continuous impactive vibrations corresponding to the signal, thereby increasing the reality of a user.

Figure 19A:
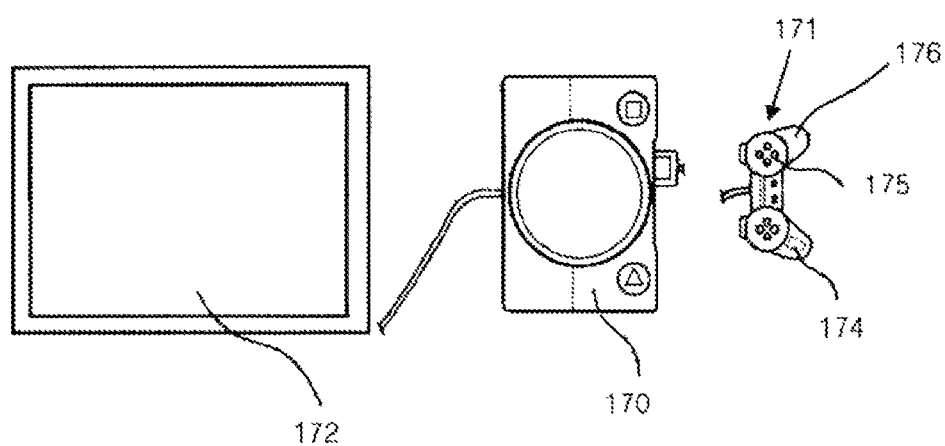
FIGS. 19A and 19B are conceptual views illustrating a game device according to an embodiment of the present invention.
Figure 19B:
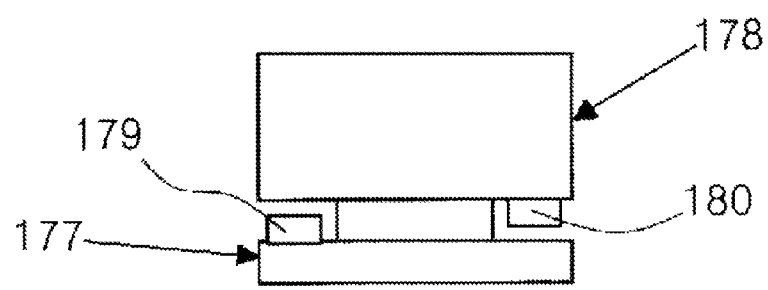

FIG. 19A is a conceptual view illustrating a game console and FIG. 19B is a conceptual view illustrating an impactive vibration generating apparatus 174 according to an embodiment of the present invention. A game console 170 may be provided for executing the game contents, controlling the progress or the state of a game and transmitting and receiving a signal to and from the surrounding devices by processing data. Further, an output unit 172 may be provided which is connected to the game console and outputs an image or sound in accordance with the game contents or the signal produced if necessary, from the game console. The output unit 172 may include an image device or a speaker, etc. Meanwhile, a game controller 171 may be provided for transmitting and receiving a signal to and from the game console 170 and producing a signal with the operation of the game by a user, wherein the game controller may be provided with a plurality of game operation buttons 175 capable of producing a game operation signal by a user. Further, a case 176 may be provided for supporting the game operation button 175 and protecting internal members. Further, the impactive vibration generating apparatus 174 may be provided inside the case 176 and the impactive vibration generating apparatus 174 may be provided with a fixing unit 177 and a rotary unit 178 rotating with respect to the fixing unit 177. A stopper 179 may be provided on the fixing unit 177 and a protrusion 180 may be provided on the rotary unit 178, wherein the protrusion 180 contacts the stopper 179 to interrupt the rotation of the rotary unit when the rotary unit 178 rotates. The stopper 179 may be attached to one part of the fixing unit 177, however, it is not limited thereto and it may be attached to other elements in addition to the fixing unit 177. The impactive vibration generating apparatus according to the embodiments shown in FIGS. 7, 9, 11 to 17, or combination thereof may be used as the impactive vibration generating apparatus 174 for the game console. The impactive vibration generating apparatus 174 produces a single impactive vibration or continuous impactive vibrations corresponding to the game contents executed in the game console 170, thereby increasing the reality for a user.

Figure 20A:
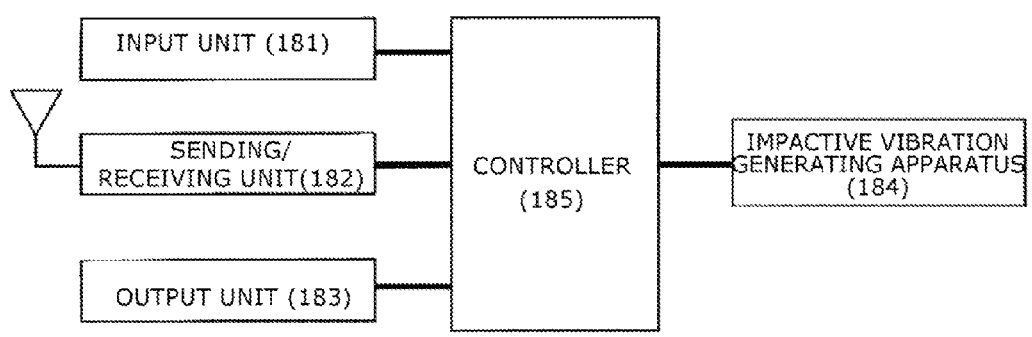
FIGS. 20A and 20B are conceptual views illustrating a communication terminal according to an embodiment of the present invention.
Figure 20B:
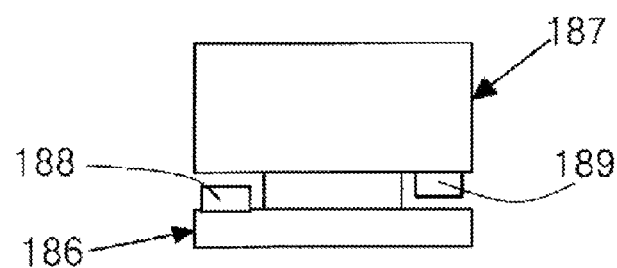

FIG. 20A is a block diagram of a communication terminal according to an embodiment of the present invention and FIG. 20B is a conceptual view illustrating an impactive vibration generating apparatus 184 according to an embodiment of the present invention. A controller 185 may be provided for processing a signal and data, executing or controlling the contents and controlling devices. Further, an input unit 181 may be provided for transmitting a signal to the controller 185 by a user and the input unit may include a button, a touch panel and a mike, etc. In addition, a sending/receiving unit 182 for sending/receiving radio waves may be provided to be connected to the controller 185. Meanwhile, an output unit 183 for outputting an image or sound may be provided to be connected to the controller 185 wherein the output unit 183 may include an image device and a speaker, etc. The impactive vibration generating apparatus may be operated in accordance with the signal from the controller 185 and the impactive vibration generating apparatus 184 may be provided with a fixing unit 186 and a rotary unit 187 rotating with respect to the fixing unit 186. A stopper 188 may be provided on the fixing unit 186 and a protrusion 189 may be provided on the rotary unit 187, wherein the protrusion 189 contacts the stopper 188 to interrupt the rotation of the rotary unit when the rotary unit 187 rotates. The stopper 188 may be attached to one part of the fixing unit 186, however, it is not limited thereto and it may be attached to other elements in addition to the fixing unit 186. The impactive vibration generating apparatus according to the embodiments shown in FIGS. 7, 9, 11 to 17, or combination thereof may be used as the impactive vibration generating apparatus 184 for the communication terminal. The impactive vibration generating apparatus 184 produces a single impactive vibration or continuous impactive vibrations in accordance with the signal from the controller 185 corresponding to the arrival signal of a telephone or a message, an input signal from the input unit 181, or the contents executed in the communication terminal, thereby increasing the reality for a user.

Figure 21A:
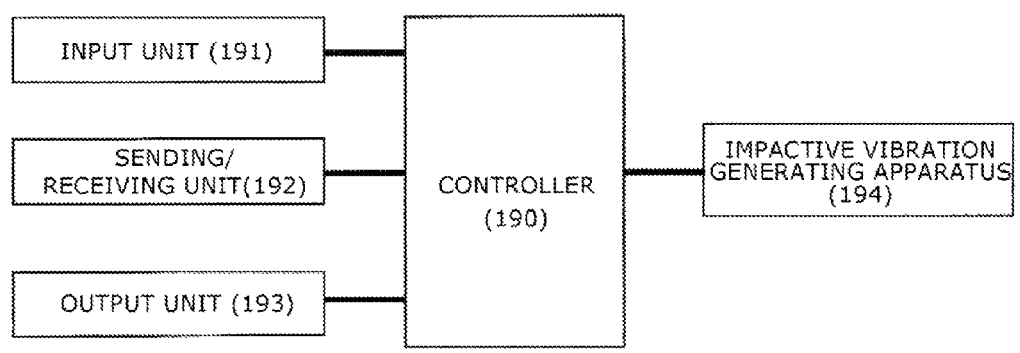
FIGS. 21A and 21B are conceptual views illustrating a multimedia player according to an embodiment of the present invention.
Figure 21B:
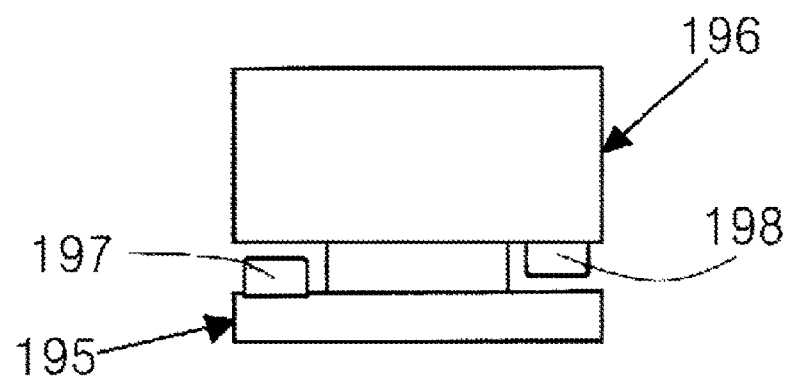

FIG. 21A is a block diagram of a multimedia player according to an embodiment of the present invention and FIG. 21B is a conceptual view illustrating an impactive vibration generating apparatus 194 according to an embodiment of the present invention. The multimedia player may include a controller 190 for processing a signal and controlling devices and an input unit 191 for transmitting a signal from a user to the controller 190. The input unit 191 may include a button, a mike, a touch panel, etc. In addition, a sending/receiving unit 192 for sending/receiving a signal such as sound or data may be provided to be connected to the controller 190. Further, an output unit 193 for outputting an image or sound may be provided to be connected to the controller 190, wherein the output unit 193 may include an image device, a speaker, etc. The impactive vibration generating apparatus 194 may be operated in accordance with the signal from the controller 190 and it may be provided with a fixing unit 195 and a rotary unit 196 rotating with respect to the fixing unit 195. A stopper 197 may be provided on the fixing unit 195 and a protrusion 198 may be provided on the rotary unit 196, wherein the protrusion 198 contacts the stopper 197 to interrupt the rotation of the rotary unit when the rotary unit 196 rotates. The stopper 197 may be attached to one part of the fixing unit 195, however, it is not limited thereto and it may be attached to other elements in addition to the fixing unit 195. The impactive vibration generating apparatus according to the embodiments shown in FIGS. 7, 9, 11 to 17, or combination thereof may be used as an impactive vibration generating apparatus 184 for the multimedia player. The impactive vibration generating apparatus 194 produces physical impactive vibrations such as a single impactive vibration or continuous impactive vibrations in accordance with the signal from the controller 190, thereby increasing the reality for a user.

Figure 22A:
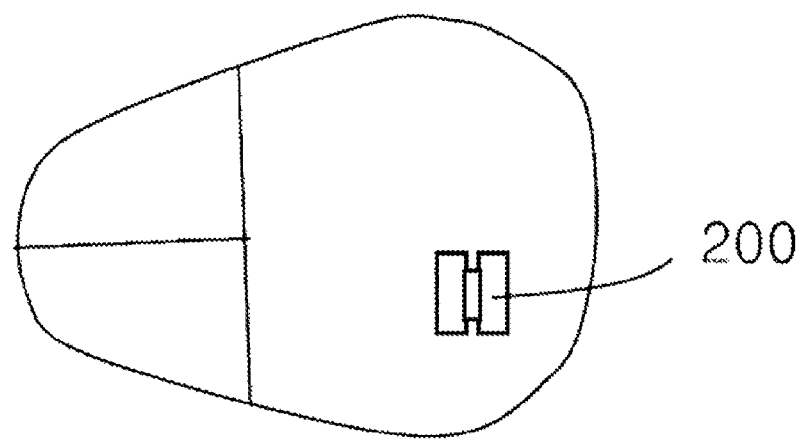
FIG. 22A is a conceptual view illustrating a mouse as an input device for a computer according to an embodiment of the present invention.
Figure 22B:
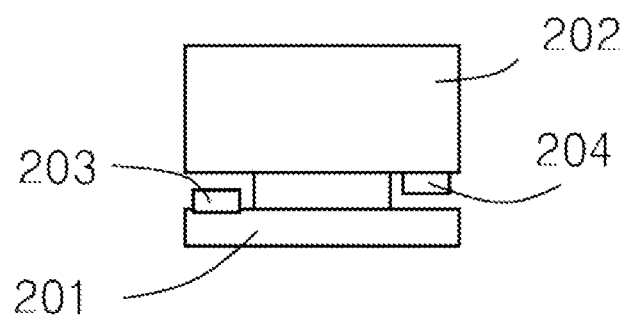
FIG. 22B is a conceptual view illustrating an impactive vibration generating apparatus according to an embodiment of the present invention.

FIG. 22A is a view illustrating a mouse according to an embodiment of the present invention, and FIG. 22B is a conceptual view illustrating an impactive vibration generating apparatus according to an embodiment of the present invention. An impactive vibration generating apparatus 200 may be included in a mouse as one of the input devices for a computer through movement on a desk, then a cursor appearing on a picture is moved and a button of which is pushed to select order words or execute a program. The impactive vibration generating apparatus 200 may be provided with a fixing unit 201 and a rotary unit 202 rotating with respect to the fixing unit 201. A stopper 203 may be provided on the fixing unit 201 and a protrusion 204 may be provided on the rotary unit 202, wherein the protrusion 204 contacts the stopper 203 to interrupt the rotation of the rotary unit when the rotary unit 202 rotates. The stopper 203 may be attached to one part of the fixing unit 201, however, it is not limited thereto, but may be attached to other elements in addition to the fixing unit 201. The impactive vibration generating apparatus according to the embodiments shown in FIGS. 7, 9, 11 to 17, or combination thereof may be used as an impactive vibration generating apparatus 184 for the mouse.

INDUSTRIAL APPLICABILITY

The foregoing is illustrative of example embodiments and is not to be construed as limiting thereof. Although example embodiments have been described, those skilled in the art will readily appreciate that many modifications are possible in example embodiments without materially departing from the novel teachings and advantages of example embodiments. Further, it is to be understood clearly that various combinations, variations and modified embodiments within equivalents can be made easily by using the features described above in (A), (B), (C), (D) and (E). Therefore, the true technical protection scope has to be defined as the following claims.

What is claimed is:

1. An impactive vibration generating apparatus comprising:
   a shaft;
   a rotary unit, wherein the shaft is arranged at its center, a magnet is rotatably arranged around the shaft and the rotary unit rotates over 180 degrees, but less than 360 degrees;
   a fixing unit for supporting the shaft, wherein at least three wound-coils are arranged with an equal spacing to face said magnet and air gaps are formed between the magnet and the coils, thereby to form a magnetic flux for generating a rotational force in the air gap;
   a circuit board provided in the fixing unit;
   a magnetic pole location detection element for detecting a magnetic pole of the rotary unit to control current of the coils, wherein the magnetic pole location detection element is provided in the circuit board;
   a protrusion attached to one part of the rotary unit and rotating over 180 degrees, but less than 360 degrees; and
   a stopper for impacting on the protrusion to generate an impactive vibration, wherein the stopper is arranged so as not to directly contact the rotary unit;
   wherein the magnitude of the impactive vibration is in proportion to the weight and the rotation speed of the rotary unit,
   wherein the number of the impactive vibration is adjusted by the number of revolution of the rotary unit,
   wherein the frequency of the impactive vibration is controlled by controlling the generation frequency of the impactive vibration through the adjustment of the collision frequency of the stopper and the protrusion.

2. The impactive vibration generating apparatus of claim 1, wherein the coils are wound around a winding-core to form a flow of magnetic flux in a radial direction of the shaft;
   the coils are arranged in the holder provided with a bearing;
   the rotary unit includes a rotation-case;
   the stopper is formed integrally with the holder and arranged within a rotating track of the rotation-case;
   the shaft is arranged coaxially with the rotation-case and inserted into the bearing;
   the rotation-case forms an inner space to surround the fixing unit;
   the magnet faces the coils in a radial direction of the shaft and is arranged in an inner peripheral surface of the rotation-case such that it surrounds the coils; and
   the coils forms air gaps in a radial direction of rotation with the magnet.

3. The impactive vibration generating apparatus of claim 1, wherein the rotary unit includes a rotation-case arranged coaxially with the shaft;
   the magnet is arranged in the rotation-case and arranged around the shaft to form a flow of magnetic flux in an axial direction of the shaft;
   the protrusion is provided in the rotation-case;
   the fixing unit includes a fixing plate;
   a bearing for supporting the shaft inserted therein is provided in the fixing plate;
   the coils faces the magnet in a axial direction of the shaft;
   the stopper is provided in the fixing plate and arranged within a rotating track of the rotation-case; and
   the coils forms air gaps in an axial direction of the rotation with the magnet.

4. An impactive vibration generating apparatus comprising:
   a shaft;
   a rotary unit, wherein the shaft is arranged at its center, at least three wound-coils are rotatably arranged with an equal spacing around the shaft, a commutator is arranged coaxially around the outer surrounding of the shaft to apply current to the coils and the rotary unit rotates over 180 degrees, but less than 360 degrees;
   a fixing unit having a bearing for supporting the shaft, wherein a magnet is arranged to face said coil, air gaps are formed between the magnet and the coils, thereby to form a magnetic flux for generating a rotational force in the air gaps and a brush is provided to slidably contact the commutator;
   a protrusion attached to one part of the rotary unit and rotating together with the coils over 180 degrees, but less than 360 degrees; and
   a stopper for impacting on the protrusion to generate an impactive vibration, the stopper is arranged so as not to directly contact the rotary unit;
   wherein the magnitude of the impactive vibration is in proportion to the weight and the rotation speed of the rotary unit,
   wherein the number of the impactive vibration is adjusted by the number of revolution of the rotary unit,
   wherein the frequency of the impactive vibration is controlled by controlling the generation frequency of the impactive vibration through the adjustment of the collision frequency of the stopper and the protrusion.

5. The impactive vibration generating apparatus of claim 4, wherein the fixing unit forms an inner space to surround the rotary unit and further comprises a bearing for supporting the shaft inserted therein;
   the magnet is provided inside of the fixing unit to form a magnetic flux of a radial direction between the magnet and the shaft;
   the coils of the rotary unit are arranged inside of the fixing unit to face the magnet in a radial direction;
   the protrusion is provided in the rotary unit inside of the fixing unit;
   the stopper is provided inside of the fixing unit and arranged within a rotating track of the rotary unit; and
   the magnet is arranged in the fixing unit to form air gaps in a radial direction of rotation with the coils.

6. The impactive vibration generating apparatus of claim 4, wherein the fixing unit includes a fixing plate;
   the magnet is arranged in the fixing plate to generate a flow of magnetic flux in an axial direction of the shaft;
   the stopper is provided in the fixing plate and arranged within a rotating track of the rotation frame;
   the rotary unit includes the rotation frame;
   the coils faces the magnet in an axial direction of the shaft to rotate together with the frame;
   the commutator provided in the rotary unit is arranged coaxially with the rotation frame and connected to the coils to rotate together with the coils;
   the brush is provided in the fixing plate and the brush slidably contacts the commutator to supply current to the coils; and
   the magnet forms air gaps in an axial direction of rotation with the coils.

7. The impactive vibration generating apparatus of claim 1 or 4, wherein the stopper is provided in the case or frame of the corresponding object in which the impactive vibration generating apparatus is mounted.

8. A game controller comprising:
a plurality of game operating buttons for producing a game operating signal;
a controller for sending operation data acquired from the plurality of game operating buttons and receiving transmission data; and
an impactive vibration generating apparatus for producing impactive vibrations in accordance with a signal from the controller;
wherein the impactive vibration generating apparatus comprises the impactive vibration generating apparatus according to claim 1 or 4.

9. A game device comprising:
a console for controlling a game state, processing data, and transmitting and receiving signal to and from surrounding devices;
an output unit connected to the console and outputting an image or sound;
a game controller for transmitting and receiving a signal to and from the console, and producing a signal by operation of a user; and
an impactive vibration generating apparatus for producing an impactive vibration in accordance with a signal from the game controller;
wherein the impactive vibration generating apparatus comprises the impactive vibration generating apparatus according to claim 1 or 4.

10. A communication terminal comprising:
a controller for processing a signal and controlling device;
an input unit for transmitting an input signal to the controller;
a sending/receiving unit connected to the controller and transmitting and receiving a signal;
an output unit connected to the controller and outputting an image or sound; and
an impactive vibration generating apparatus for producing impactive vibrations in accordance with the signal from the controller;
wherein the impactive vibration generating apparatus comprises the impactive vibration generating apparatus according to claim 1 or 4.

11. A multimedia player comprising:
a controller for processing a signal and controlling device;
an input unit for transmitting an input signal to the controller;
a sending/receiving unit connected to the controller and transmitting and receiving a signal;
an output unit connected to the controller and outputting an image or sound; and
an impactive vibration generating apparatus for producing impactive vibrations in accordance with the signal from the controller;
wherein the impactive vibration generating apparatus comprises the impactive vibration generating apparatus according to claim 1 or 4.

12. A mouse used as an input device for a computer, including an impactive vibration generating apparatus,
wherein the impactive vibration generating apparatus comprises the impactive vibration generating apparatus according to claim 1 or 4.

* * * * *